United States Patent
Jergenson

(10) Patent No.: US 10,059,241 B2
(45) Date of Patent: Aug. 28, 2018

(54) SLIDING TABLE SYSTEM FOR A VEHICLE

(71) Applicant: Winnebago Industries, Inc., Forest City, IA (US)

(72) Inventor: Steven Jergenson, Clear Lake, IA (US)

(73) Assignee: Winnebago Industries Inc., Forest City, IA (US)

( * ) Notice: Subject to any disclaimer, the term of this patent is extended or adjusted under 35 U.S.C. 154(b) by 0 days.

(21) Appl. No.: 15/651,505

(22) Filed: Jul. 17, 2017

(65) Prior Publication Data

US 2018/0029513 A1 Feb. 1, 2018

Related U.S. Application Data

(60) Provisional application No. 62/363,484, filed on Jul. 18, 2016.

(51) Int. Cl.
| | |
|---|---|
| *A47B 11/00* | (2006.01) |
| *B60N 3/00* | (2006.01) |
| *A47B 31/06* | (2006.01) |
| *A47B 31/04* | (2006.01) |

(52) U.S. Cl.
CPC .............. *B60N 3/001* (2013.01); *A47B 31/04* (2013.01); *A47B 31/06* (2013.01)

(58) Field of Classification Search
CPC ........................ F25D 25/02; F25D 2325/023
USPC ......... 312/334.11, 334.12, 334.13, 408, 281; 108/137, 42, 44, 143; 292/141, 171, 271, 292/272, 277
See application file for complete search history.

(56) References Cited

U.S. PATENT DOCUMENTS

| | | | | |
|---|---|---|---|---|
| 2,199,981 | A * | 5/1940 | Bell | A47B 5/04 108/134 |
| 4,068,551 | A * | 1/1978 | Kreitz | B23D 47/025 108/48 |
| 9,371,029 | B2 | 6/2016 | Hillman et al. | |
| 2006/0169188 | A1* | 8/2006 | Latino | A47B 21/0073 108/147 |
| 2015/0013572 | A1* | 1/2015 | Hillman | B60P 3/36 108/44 |
| 2015/0048228 | A1* | 2/2015 | Mullins | A47B 5/04 248/240.4 |

* cited by examiner

*Primary Examiner* — Matthew W Ing
(74) *Attorney, Agent, or Firm* — Faegre Baker Daniels LLP

(57) ABSTRACT

A table system includes a cabinet housing, a slide frame positioned within the cabinet housing, an adjustable table assembly including a table support frame slideably coupled to the slide frame, and a pivot system. The pivot system includes a support mast and a sliding component. The sliding component is coupled to the support mast such that the sliding component is configured to slide up the support mast such that the adjustable table assembly pivots around a pivot point between an extended position and a folded position.

21 Claims, 31 Drawing Sheets

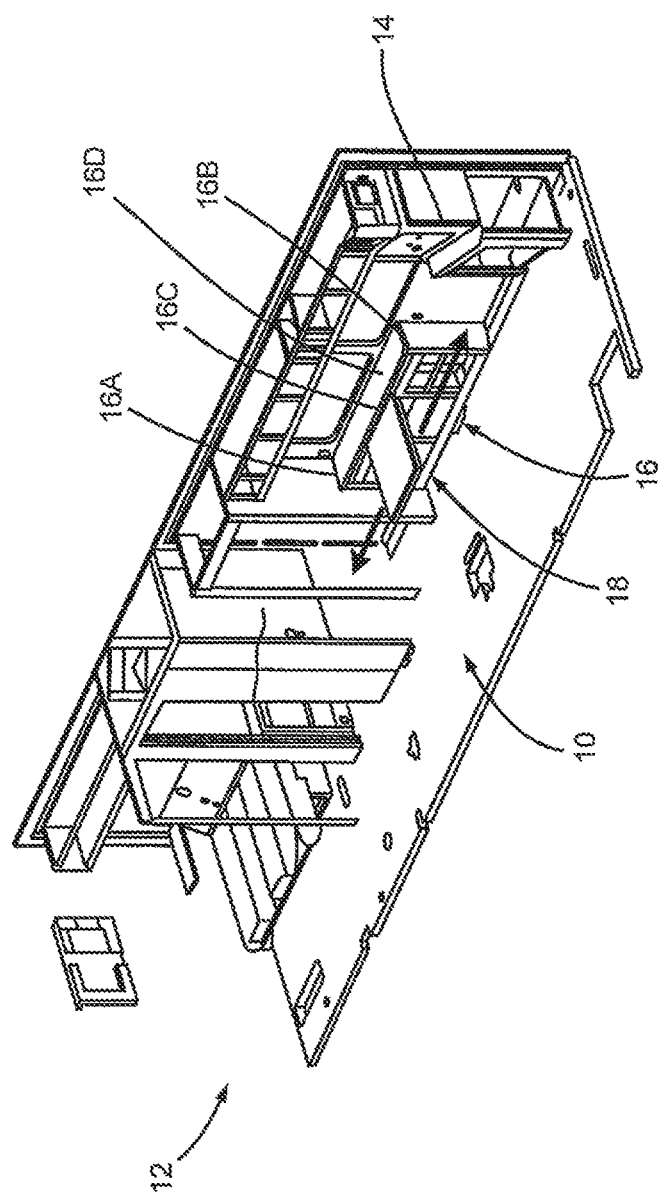

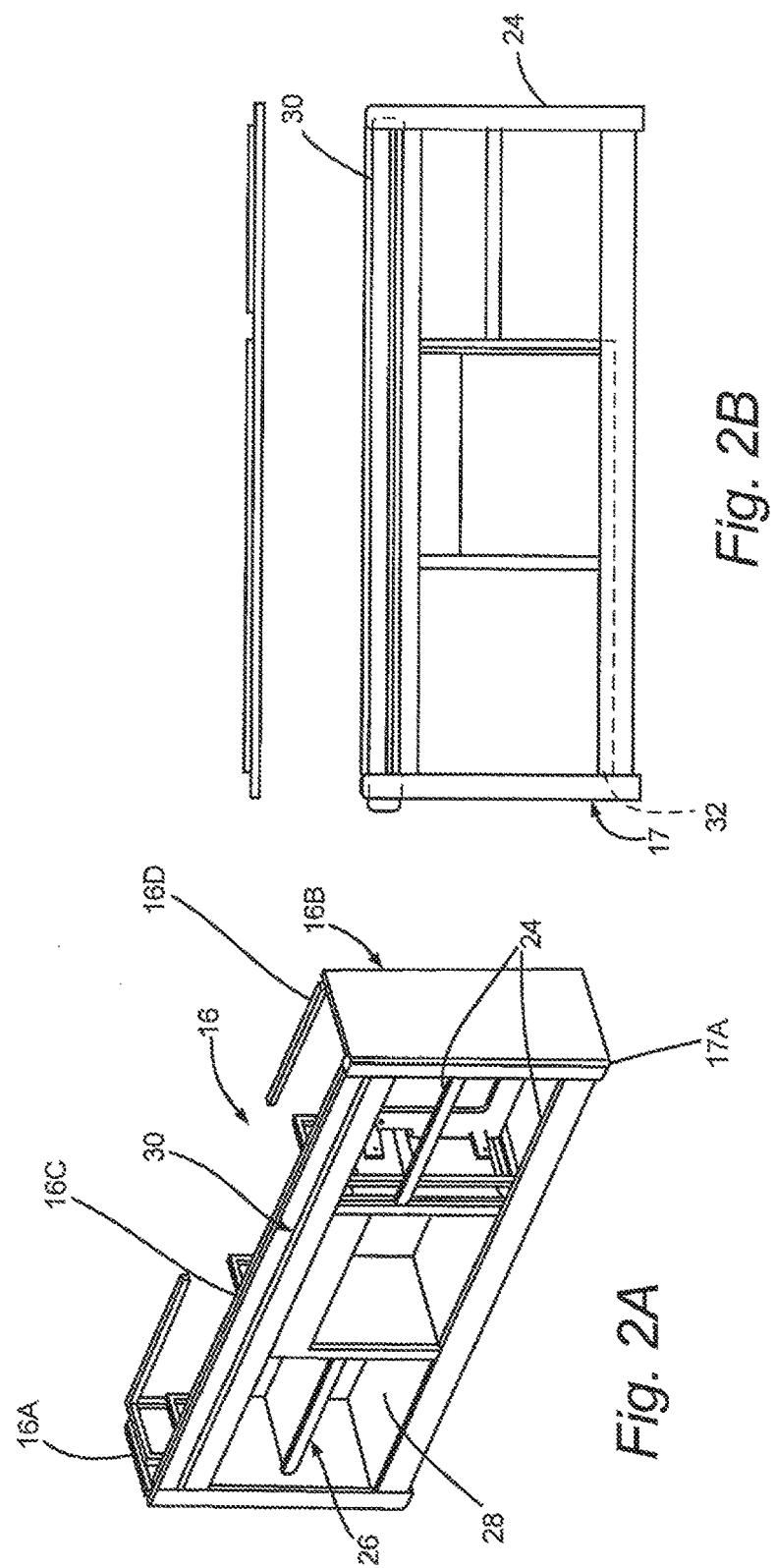

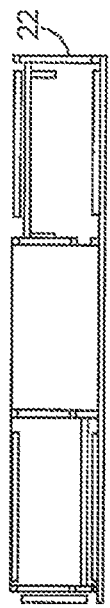
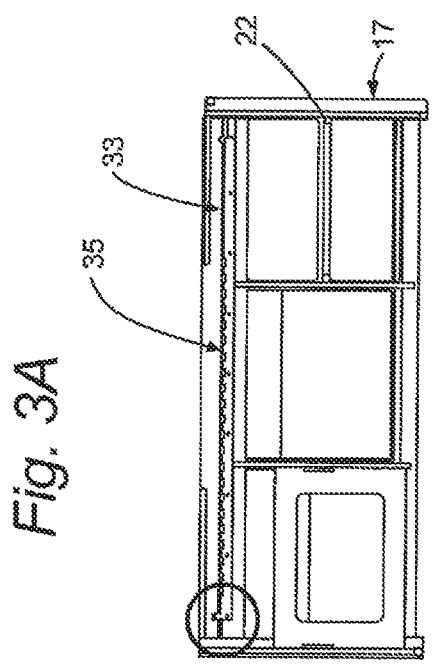
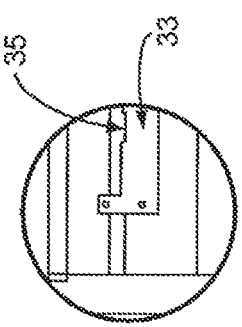

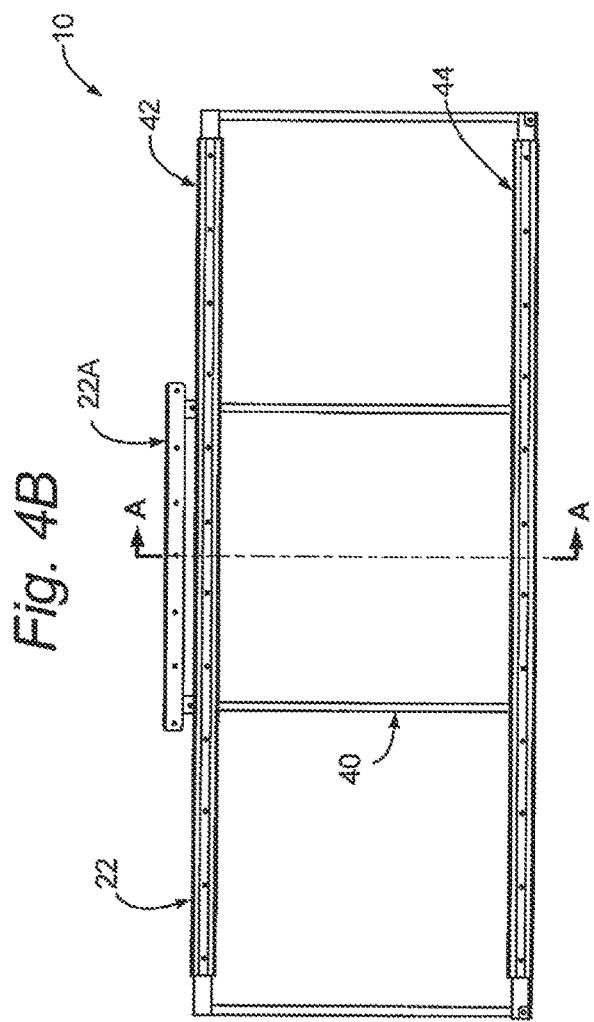
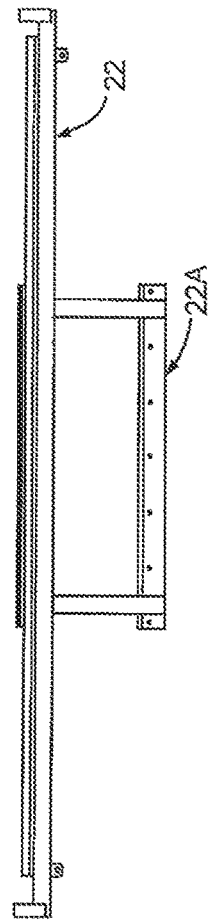
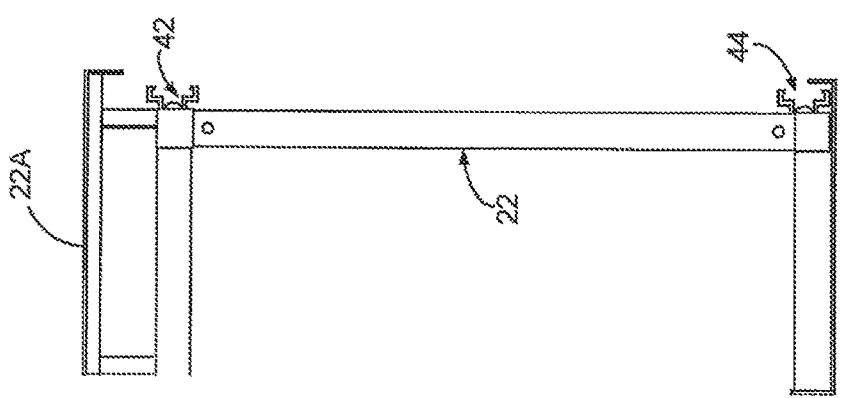
Fig. 4B
Fig. 4C
Fig. 4A

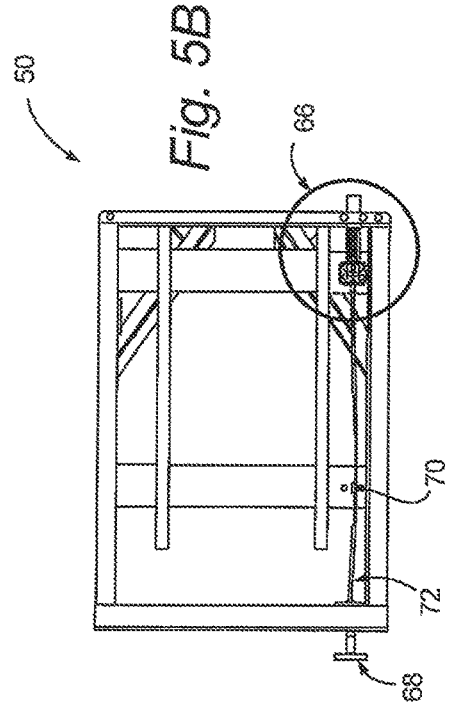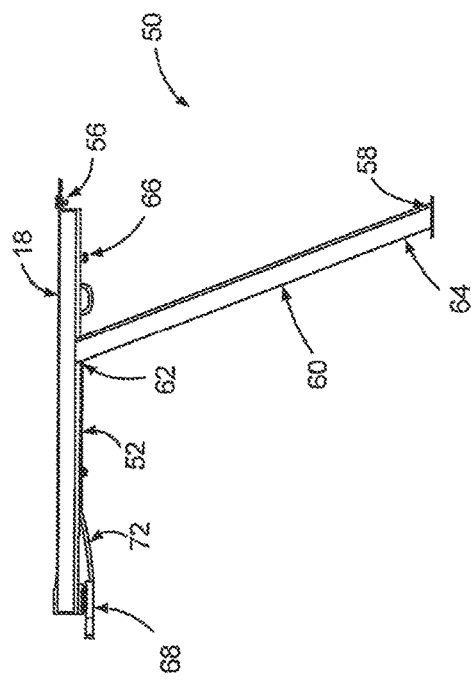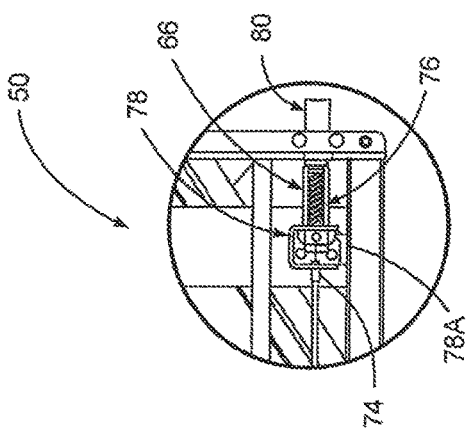

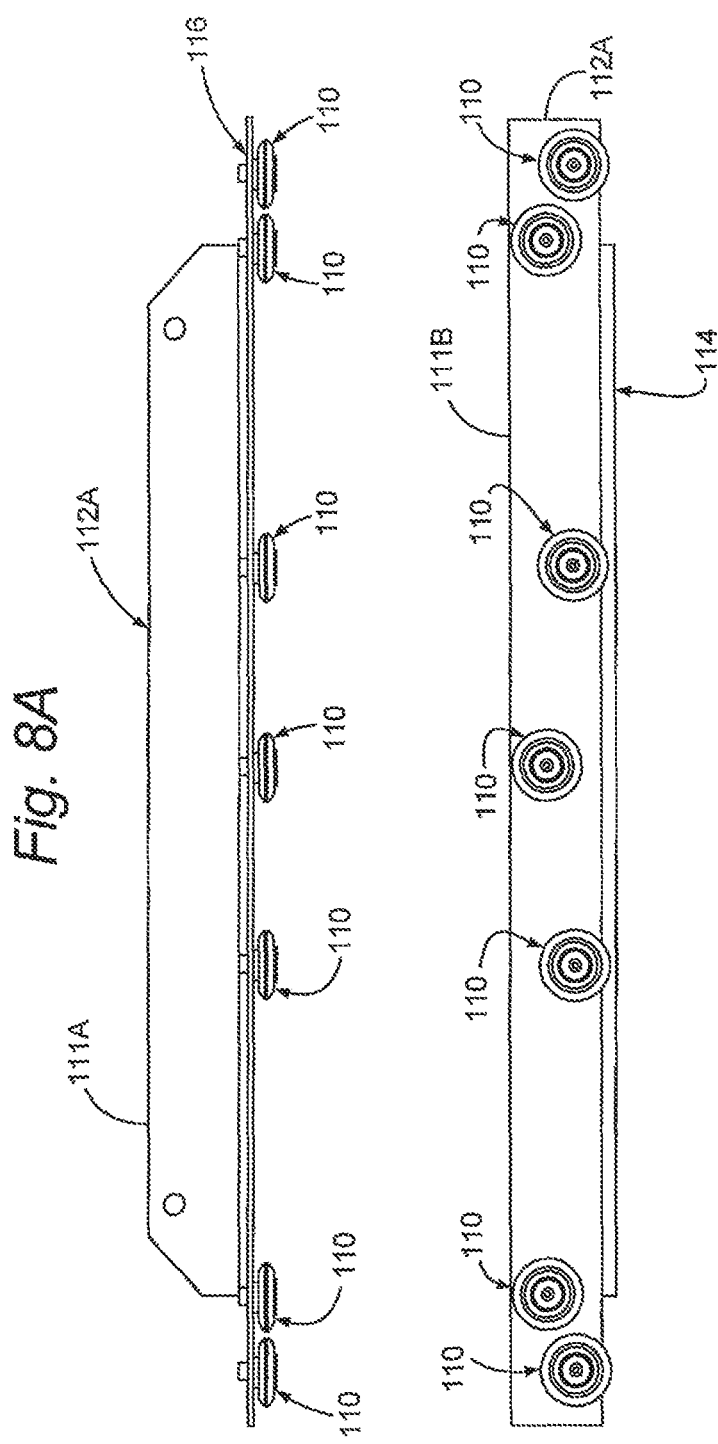

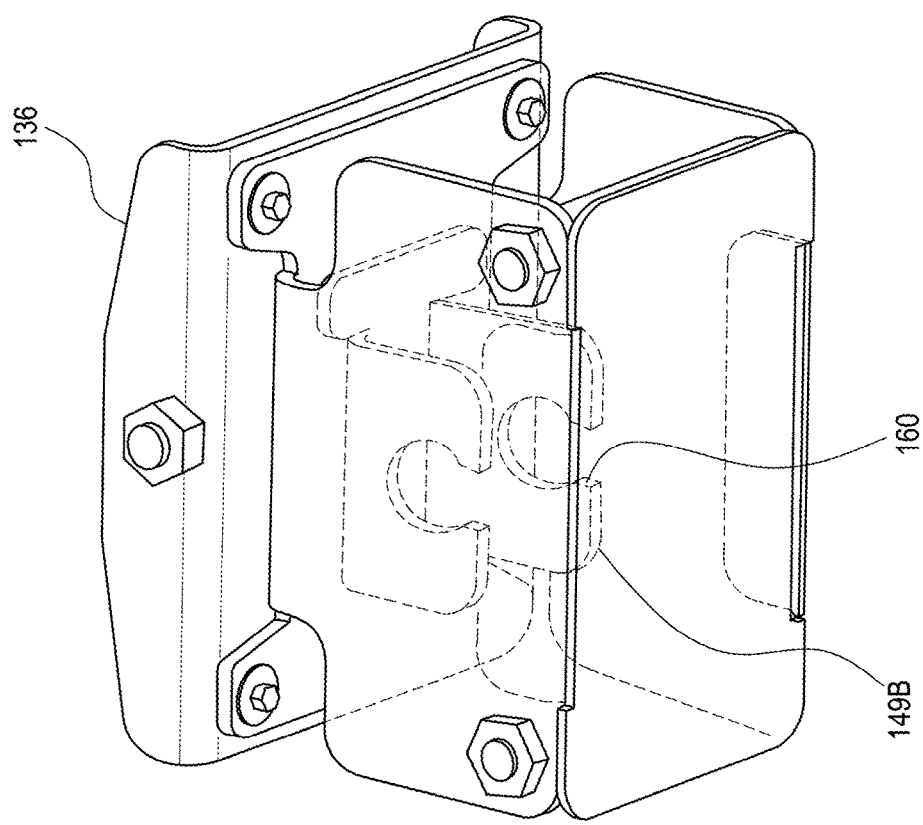

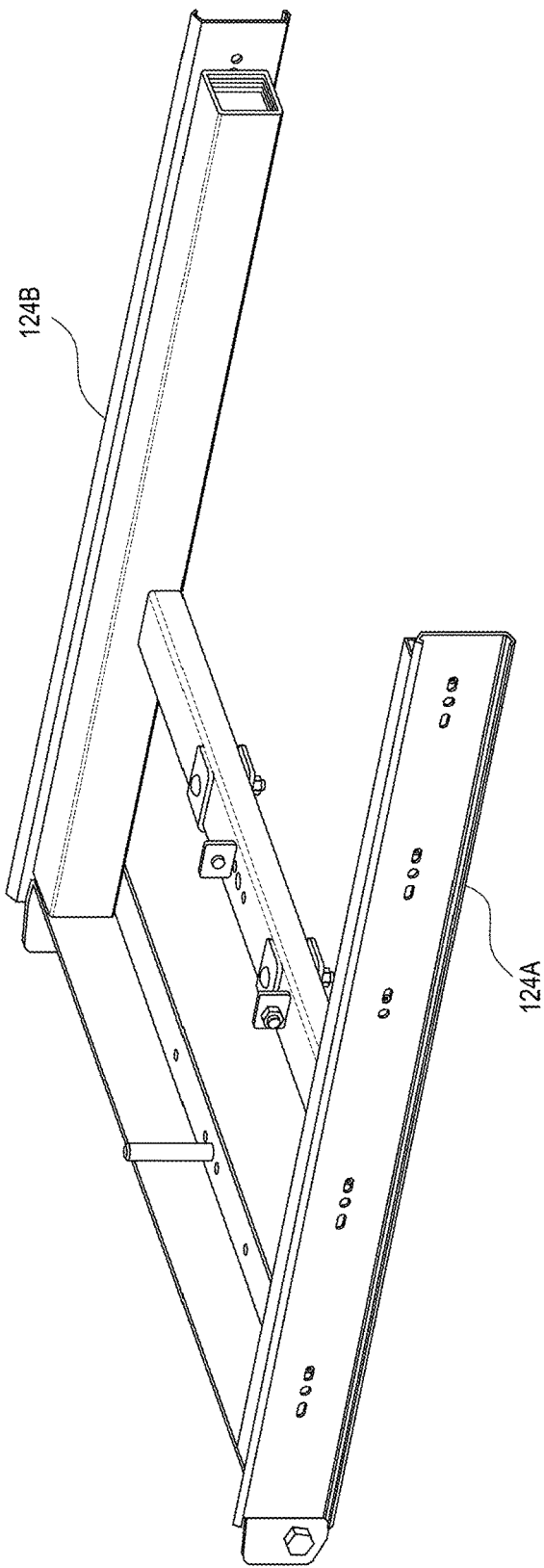

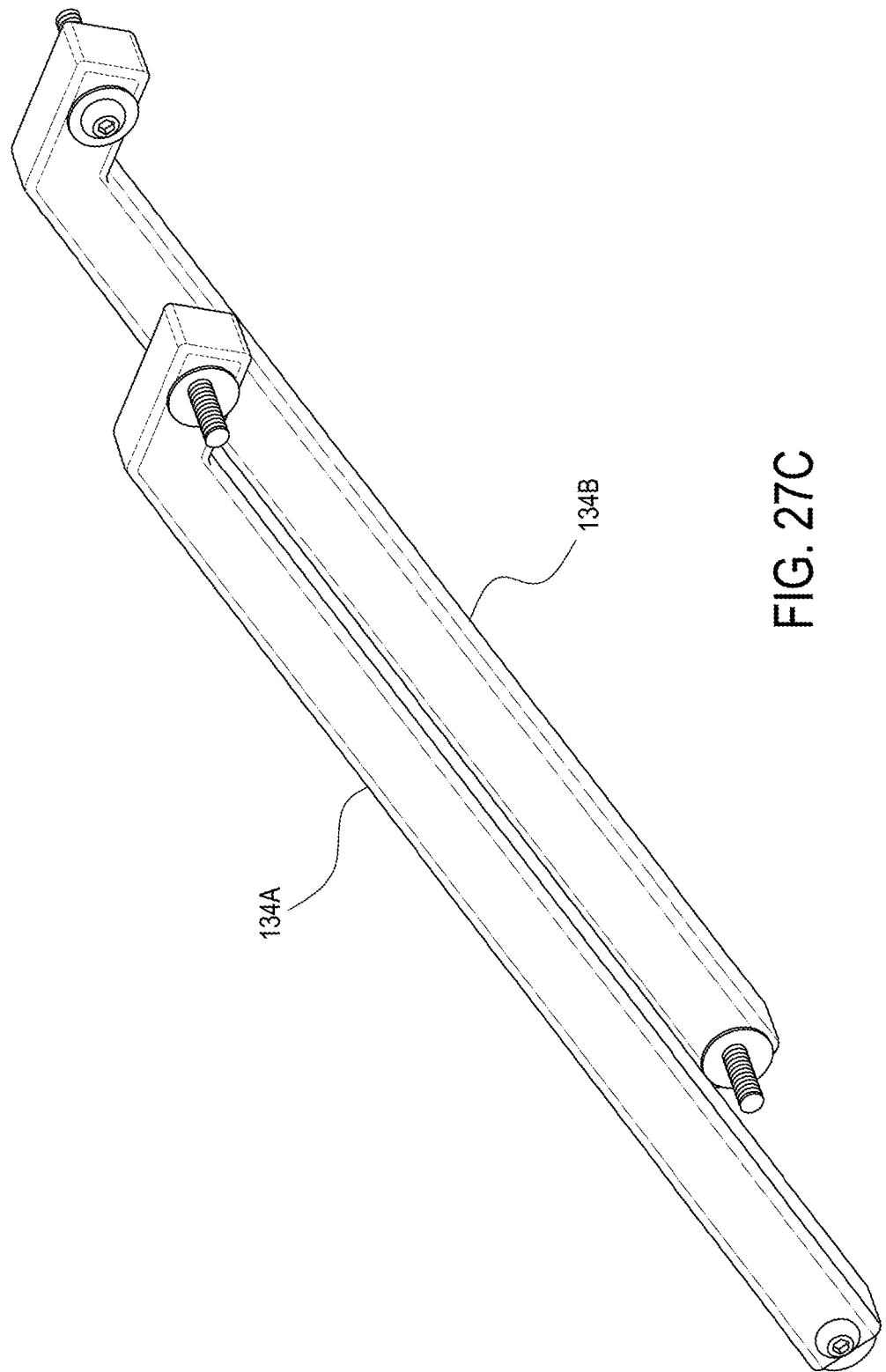

SLIDING TABLE SYSTEM FOR A VEHICLE

CROSS-REFERENCE TO RELATED APPLICATION

This application claims priority to Provisional Application No. 62/363,484, filed Jul. 18, 2016, which is herein incorporated by reference in its entirety.

BACKGROUND

Recreational vehicles, such as motor homes, travel trailers and the like have interior spacing and dimensional constraints due to the nature of the size of the highways they traverse and the corresponding transportation regulations. Therefore, there are significant restrictions on the interior space, particularly as to the width of the vehicles. However, the users of these vehicles desire the most comfortable and usable space within the limited dimensions. These constraints thus place a premium on the efficiency and design flexibility of the interior decor of such vehicles. Amongst other design imperatives, versatile and compact interior furniture is highly valuable to the users of such vehicles. In particular, tables are a key piece a furniture and the center of many activities such as enjoying meals, playing games and the like. However, tables can take up a great deal of the limited interior space of a recreational vehicle, and certain positions of a table may be ideal for some activities but not for others. Accordingly, there is a need in the art for slidable tables that can be easily repositioned, but that once positioned, are fixed and secure.

SUMMARY

In certain embodiments, a table system includes a cabinet housing, a slide frame positioned within the cabinet housing, an adjustable table assembly including a table support frame slideably coupled to the slide frame, and a pivot system. The pivot system includes a support mast and a sliding component. The sliding component is coupled to the support mast such that the sliding component is configured to slide up the support mast such that the adjustable table assembly pivots around a pivot point between an extended position and a folded position.

In certain embodiments, a table system includes an adjustable table assembly including having a proximal table portion, a distal table portion, and a folding leg. The proximal table portion includes a pivot around which the adjustable table assembly is configured to pivot. The distal table portion includes a distal end. The folding leg includes a proximal section attached near the distal end of the distal table portion. The table system includes a pivot system coupled to the adjustable table assembly. The pivot system includes a support mast and a sliding component coupled to the support mast such that the sliding component is configured to slide up and down the support mast such that the adjustable table assembly pivots around the pivot point between an extended position and a folded position.

In certain embodiments, a table system includes a cabinet housing, a slide frame positioned within the cabinet housing, an adjustable table assembly including a table support frame, means for horizontally moving the adjustable table assembly with respect to the slide frame, and means for pivoting the adjustable table assembly between an extended position and a folded position.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 1 is a perspective, cutaway view of a cabin of a recreational vehicle with a sliding table assembly.

FIG. 2A is a perspective, cutaway view of a cabinet housing.

FIG. 2B is a side view of the cabinet housing of FIG. 2A.

FIG. 3A is a rear view the cabinet housing of FIG. 2A.

FIG. 3B is a close-up view of a notch on a striker latch plate of the cabinet housing of FIG. 2A.

FIG. 3C is a top view the cabinet housing of FIG. 2A.

FIG. 4A is a cross-sectional view of a table support frame.

FIG. 4B is a front view of the table support frame of FIG. 4A.

FIG. 4C is a bottom view of the table support frame of FIG. 4A.

FIG. 5A is a side view of a sliding table assembly.

FIG. 5B is a top view of the sliding table assembly of FIG. 5A.

FIG. 5C is a close-up view of a release catch of the sliding table assembly of FIG. 5A.

FIG. 8A is a top view of a roller bearing track.

FIG. 8B is a side view of the roller bearing track of FIG. 8A.

FIG. 26 is a perspective view of a sliding component.

FIG. 27A is a perspective view of a proximal table portion.

FIG. 27C is a perspective view of braces.

DETAILED DESCRIPTION

Figure 6A:
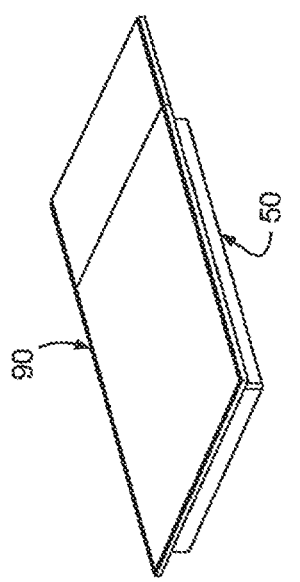
FIG. 6A is a perspective view of a table.

Certain embodiments of the present disclosure relate to various apparatuses, systems, and methods including sliding table assemblies that can be used to position a table. The various described embodiments can be used in conjunction with any of the apparatuses, systems, and methods disclosed in U.S. application Ser. No. 14/210,855, filed Mar. 14, 2014, and entitled "Slideable Table for a Vehicle," which claims priority to U.S. Provisional Application 61/789,416, filed Mar. 15, 2013, and entitled "Slideable Table for a Vehicle," both of which are hereby incorporated herein by reference in their entirety.

Exemplary embodiments of the apparatuses, systems, and methods include a sliding table system for a recreational vehicle. Although the sliding table system has been described with reference to certain exemplary embodiments, persons skilled in the art will recognize that changes may be made in form and detail without departing from the spirit and scope of the disclosed embodiments. Certain embodiments feature a sliding table system that includes a table or tabletop that is configured to fold down to allow for additional room in an interior of a recreational vehicle.

Referring now to the figures in greater detail, FIG. 1 shows a three-quarters perspective view of an interior or cabin of a recreational vehicle 12 featuring an exemplary embodiment of a sliding table system 10. The sliding table system 10 is mounted or coupled to an interior wall 14 of the recreational vehicle 12. Various exemplary embodiments of the sliding table system 10 comprise a cabinet housing 16 and an adjustable table assembly 18. As is shown in FIG. 1, the cabinet housing 16 comprises a first end 16A, a second end 16B, a front side 16C, and a back side 16D, which is fixedly attached to the interior wall 14 of the recreational vehicle 12. As discussed elsewhere herein, in certain exemplary embodiments, the cabinet housing 16 is operationally integrated with the adjustable table assembly 18. In further embodiments, the cabinet housing 16 further comprises cabinetry. In certain exemplary embodiments, the adjustable table assembly 18 is movable relative to the cabinet housing 16. In this embodiment, the movement of the adjustable table assembly 18 is substantially parallel to a floor of the recreational vehicle 12, though other embodiments are within the scope of the present disclosure and the claims.

FIGS. 2A-2B, 3A-3B, and 4A-C show that the cabinet housing 16 includes a cabinet frame 17, which generally comprises a frame face 17A, a generally rectangular table slide frame 22, mountings 24 for slide drawers (not shown), shelving 26, and cabinet space 28. Many other configurations of basic cabinet assemblies can also be included. A principle aspect of the cabinet frame face 17A in these exemplary embodiments is a first substantially slotted opening, or first slot 30, which is operationally connected to a table support frame (denoted by reference number 50 in FIGS. 6A-6C), which forms part of the adjustable table assembly 18. In certain embodiments, such as the one depicted in FIGS. 2A-2B, a second substantially slotted opening, or second slot 32, is operationally coupled to the table support frame 50.

As shown in FIGS. 3A-3B, in certain embodiments, a striker latch plate 33 (shown in greater detail in reference to FIG. 10) is disposed within and extends substantially the length of the cabinet housing 16 so as to extend from substantially the first end 16A to the second end 16B on the front side 16C of the cabinet housing 16. Accordingly, the striker latch plate 33 is positioned generally below the first slot 30. In certain embodiments, the striker latch plate 33 has a plurality of notches 35 at substantially equal spacing along its length. The notches 35 are positioned to receive a latch pin from a spring-tensioned release catch 66 (best shown in FIG. 5C) mounted on an underside of the table support frame 50.

As shown in FIGS. 4A-4C, the generally rectangular table slide frame 22 comprises an upper track 42 and a lower track 44. Each of the tracks 42, 44 is operationally coupled to the table support frame 50 (see FIG. 5A) via a roller bearing assembly 112A, 112B (as shown in FIGS. 8A-B and 9A-B) to allow movement of the adjustable table assembly 18 relative to the cabinet housing 16 and accordingly the generally rectangular table slide frame 22. The generally rectangular table slide frame 22 is positioned on an inside of the cabinet housing 16 such that the upper track 42 and the lower track 44 are substantially parallel with the first slot 30 and the second slot 32, respectively, in the cabinet frame face 17A (as shown in FIG. 2B), but are not visible from the interior of the recreational vehicle 12. In FIGS. 4A-4C, the table slide frame 22 further comprises a cabinet attachment member 22A, which is fixedly attached to the cabinet 16.

FIG. 4A shows a side view of the generally rectangular table slide frame 22, and the upper track 42 and the lower track 44 from section A-A of FIG. 4B. FIG. 4B shows a front view of the generally rectangular table slide frame 22 and the upper track 42 and the lower track 44 can be seen. FIG. 4C depicts the cabinet attachment member 22A coupled to the generally rectangular table slide frame 22.

FIG. 5A shows the table support frame 50 comprising a table frame assembly 52 fixedly attached to the adjustable table assembly 18. The table support frame 50 further comprises a first roller bearing assembly engagement member 56 and a second roller bearing assembly engagement member 58. The first roller bearing assembly engagement member 56 is positioned to operationally connect to the roller bearing assembly 112A through the first slot 30 (see FIG. 2B) in the frame face 17A., and the second roller bearing assembly engagement member 58 is positioned to connect operationally to the roller bearing assembly 112B through the second slot 32 (see FIG. 2B) in the frame face 17A such that both roller bearing assemblies 112A-112B are operationally coupled with the table support frame 50 by way of the upper track 42 and the lower track 44, respectively. The table support frame 50 further comprises a brace 60 having a first end 62 and a second end 64. The first end 62 is fixedly attached to the table frame assembly 52 and the brace 60 extends in a generally downward direction terminating with the second end 64 which is substantially parallel with a side of the table support frame closest to the cabinet housing 16. The second end 64 is operationally coupled to the second roller bearing assembly engagement member 58.

As shown in FIGS. 5A-5C, in certain embodiments, the table support frame 50 further comprises a spring-tensioned release catch 66. A spring tensioned release catch handle 68 is operationally coupled to the spring tensioned release catch 66 by a cable 70, which extends the length of the table support frame 50 from a side closest to the cabinet housing 16 to a side furthest from the cabinet housing 16. In certain embodiments, the cable 70 comprises a first end 72 and a second end 74 such that the first end 72 is fixedly attached to the pull handle 68 and the second end 74 is fixedly attached to the spring-tensioned release catch 66.

As is shown in FIG. 5C, in certain embodiments, the spring-tensioned release catch 66 further comprises a spring member 76 housed within a bracket member 78, which has a bracket latch 78A and a table latch pin 80. In certain embodiments, the spring-tensioned release catch 66 has two states: an unlocked state and a locked state. In the locked state, the spring member 76 exerts pressure on the table latch pin 80 pushing to push the table latch pin 80 into the notch 35 of the striker latch plate 33 (as best shown in FIG. 3B) thereby preventing movement of the table 18. In the unlocked state, the pull handle 68 is pulled and the spring member 76 is compressed such that the table latch pin 80 is withdrawn from the notch 35 of the striker latch plate 33 thereby allowing for movement of the adjustable table assembly 18. When the pull handle 68 is released, the spring member 76 extends and the latch pin 80 is coupled to one of the notches 35 on the striker latch plate 33 and the adjustable table assembly 18 is returned to the locked state.

Figure 6B:
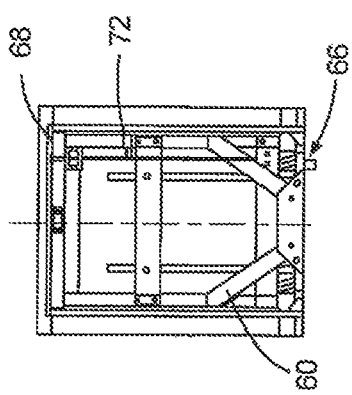
FIG. 6B is a bottom view of the table of FIG. 6A, a support frame, and a table support frame brace.

FIGS. 6A-6B show the table support frame 50 and a tabletop 90, which can form part of the adjustable table assembly 18. FIG. 6A shows a perspective view of the table top 90 coupled to the table support frame 50. FIG. 6B shows an underside of the table support frame 50 including at least one brace 60 and the spring tensioned release catch 66.

Figure 7A:
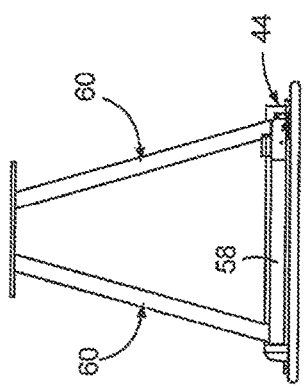
FIG. 7A is a side view two braces, a lower track, and a roller bearing assembly engagement member.
Figure 7B:
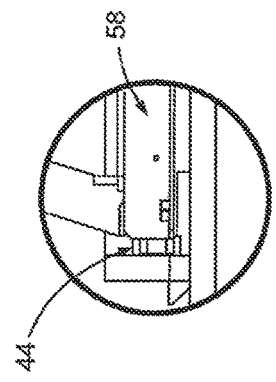
FIG. 7B is a close-up view of the lower track and roller bearing assembly engagement member of FIG. 7A.

FIGS. 7A-7B show two braces 60, the lower track 44, and the roller bearing assembly engagement member 58 coupled together.

FIGS. 8A-8B show an upper roller bearing assembly 112A with roller bearings 110. The upper roller bearing assembly 112A comprises a horizontal plane 111A and a vertical plane 111B, with the roller bearings 110 being mounted to the vertical plane 111B. When assembled together, the upper roller bearing assembly 112A is fixedly attached to the table support frame 50 and functionally integrated into the table slide frame 22. In these implementations, the roller bearings 110 have been specifically designed and engineered to support the weight of the table 18 as well as allow the roller bearings 110 to move within the table slide frame 22 and the upper track 42. In certain implementations, the roller bearings 110 are affixed to a roller bearing plate 114. In certain embodiments, a spacer 116 (e.g., a washer) is positioned between the roller bearings 110 and the vertical plane 111B. In these embodiments, the roller bearings 110 engage with a slider plate (not shown) and/or the upper track 42 and/or the lower track 44 inside the cabinet housing 16 and allow for movement of the adjustable table assembly 18 in a substantially horizontal direction between a front or rear of the recreational vehicle 12.

Figure 9C:
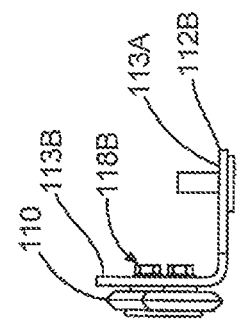
FIG. 9C is an end view of the roller bearing track of FIG. 9A.
Figure 9A:
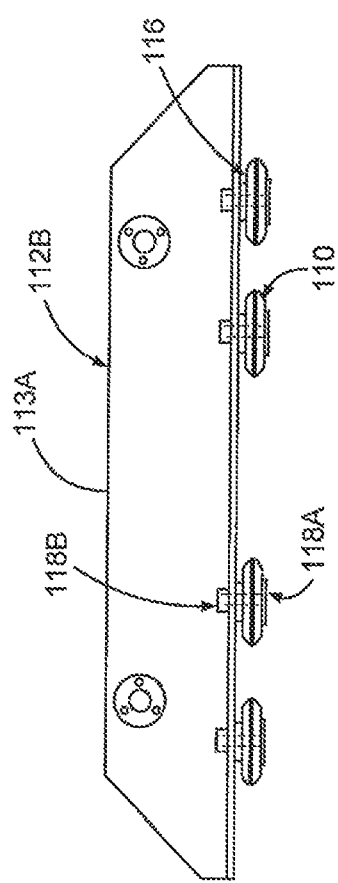
FIG. 9A is a top view of a roller bearing track.
Figure 9B:
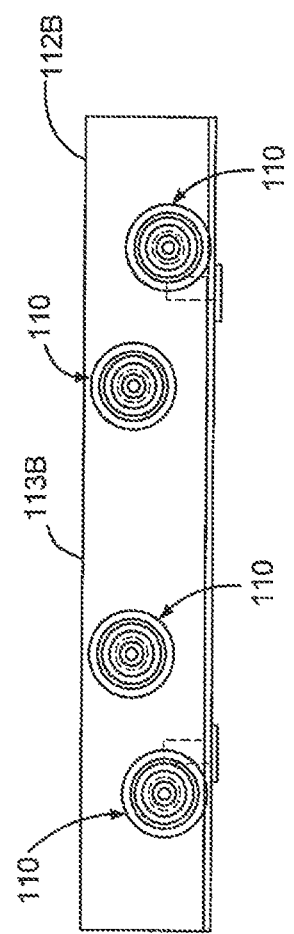
FIG. 9B is a side view of the roller bearing track of FIG. 9A.

FIGS. 9A-9C show a lower roller bearing assembly 112B with roller bearing 110. The lower roller bearing assembly 112B comprises a horizontal plane 113A and a vertical plane 113B, with the roller bearings 110 being mounted to the vertical plane 113B. The lower roller bearing assembly 112B is positioned on a lower part of the table support frame 50, for example, by being engaged by a bottom leg of the support brace 60 and operationally coupled with the table slide frame 22 and lower track 44 through the second slot 32 of the cabinet frame 17 (see FIG. 2). In certain embodiments, a plurality of fasteners 118A, 118B, such as screws and nuts, are used in combination with an optional spacer 116 to affix the roller bearings 110 to lower roller bearing assembly 112B.

Figure 10A:
FIG. 10A is a top view of a striker latch plate.
Figure 10B:
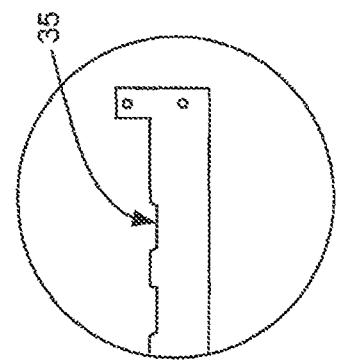
FIG. 10B is a close-up view of one end of the striker latch plate FIG. 10A.
Figure 11:
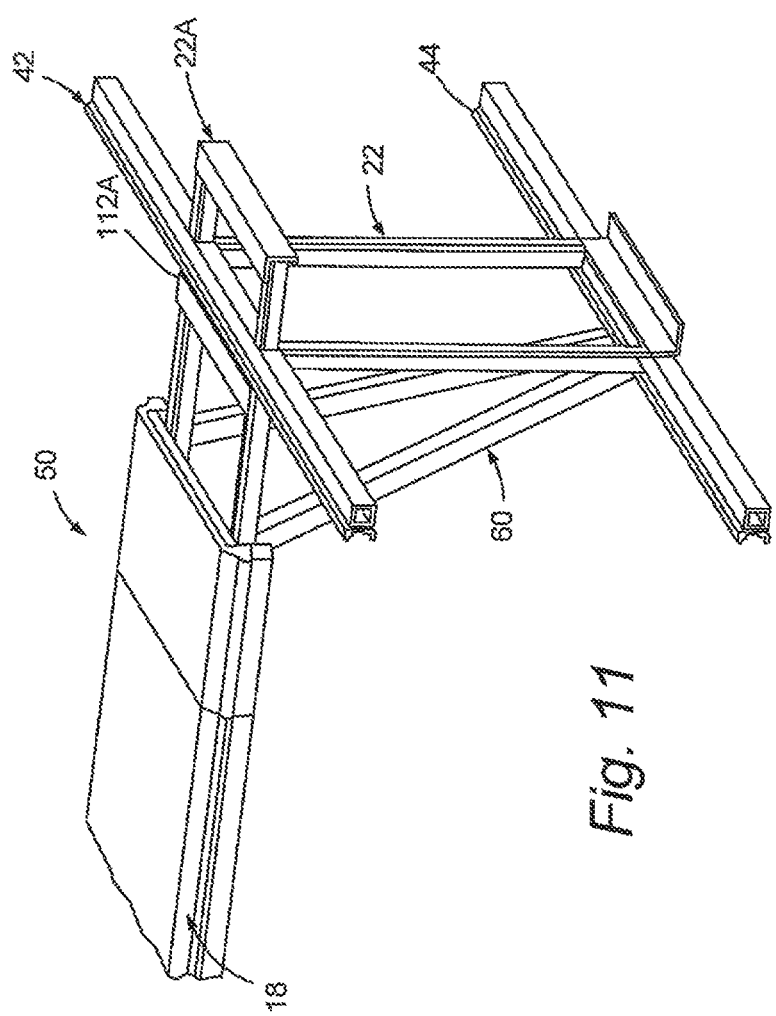
FIG. 11 is a perspective view of a sliding table assembly.

FIGS. 10A-10B show the striker latch plate 33 and a plurality of notches 35. FIG. 10B shows a close up the striker latch plate 33 and a few of the notches 35.

FIGS. 11-16 depict various exemplary implementations of the sliding table system 10 showing the table 18, the table support frame 50, the brace 60, the table slide frame 22, the upper roller bearing track 42, and the lower roller bearing track 44. The table support frame 50 is operationally integrated to the table slide frame 22 by way of the roller bearing assemblies 112A, 112B. Various other configurations are possible.

Figure 12:
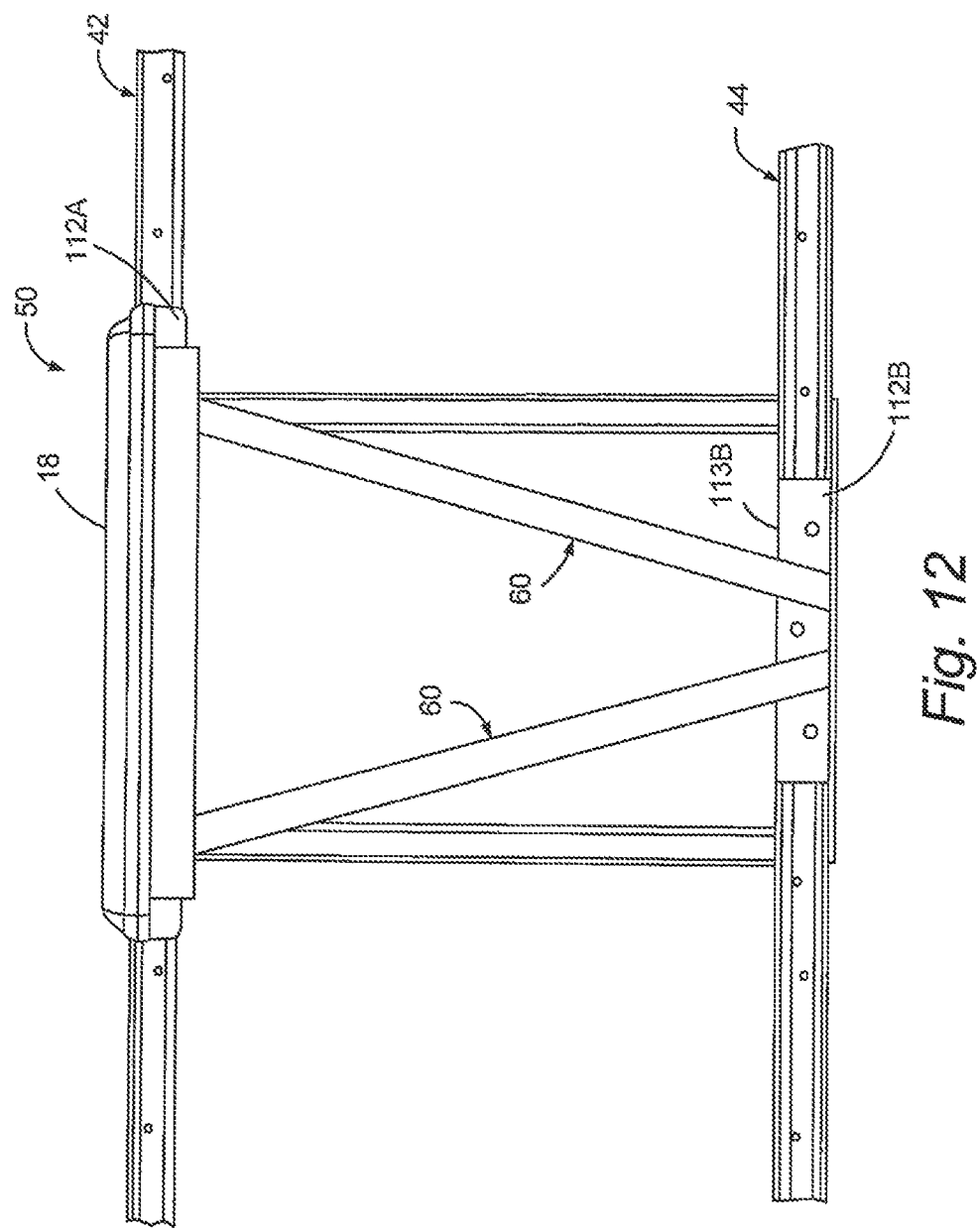
FIG. 12 is a front view of the sliding table assembly of FIG. 11.
Figure 13:
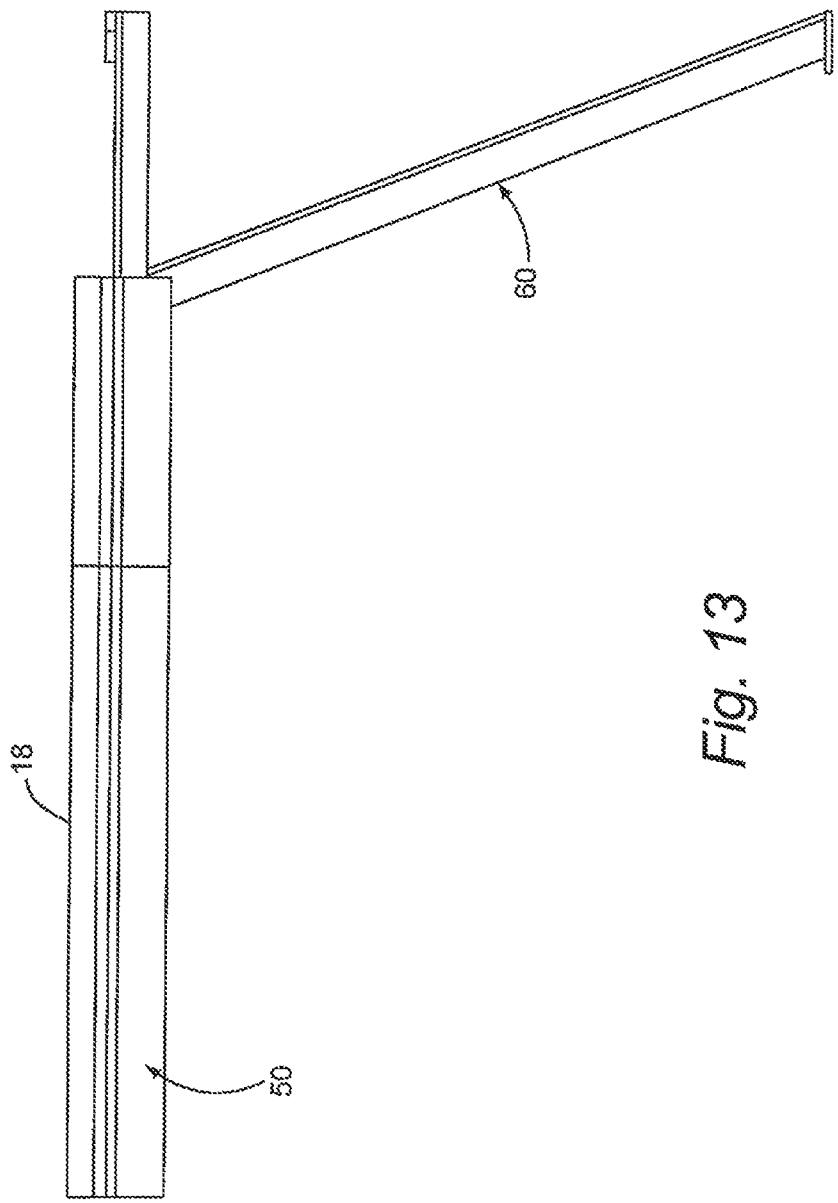
FIG. 13 is a side view of a portion of the sliding table assembly of FIG. 11.
Figure 14:
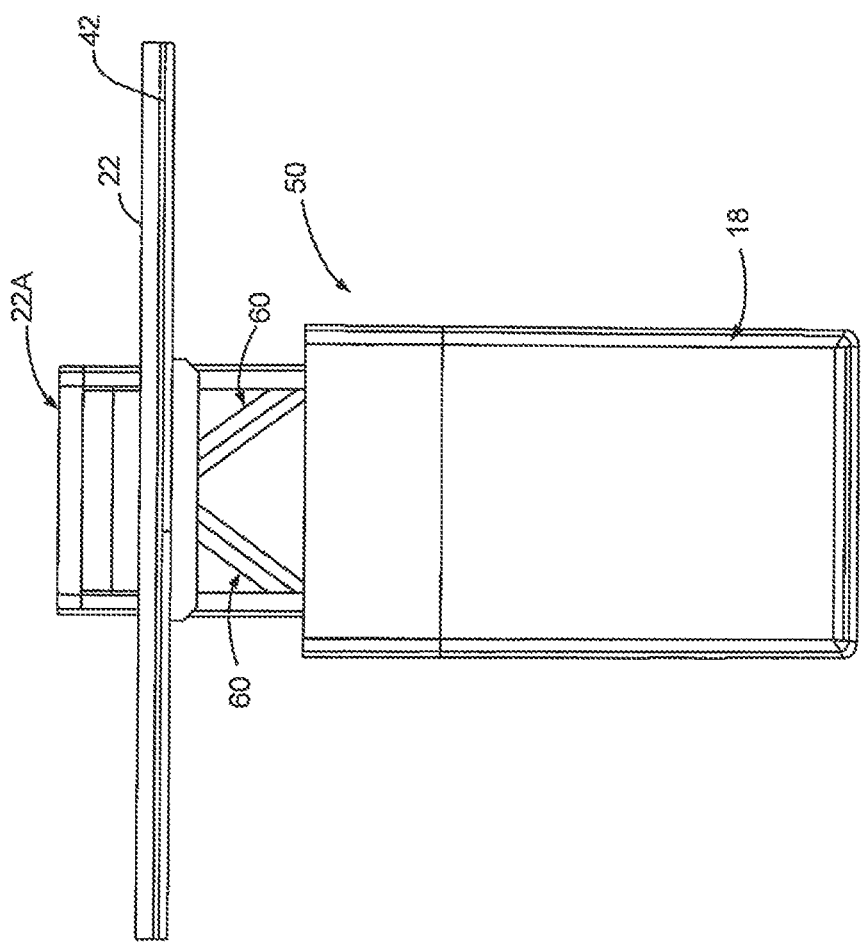
FIG. 14 is a top view of the sliding table assembly of FIG. 11.
Figure 15:
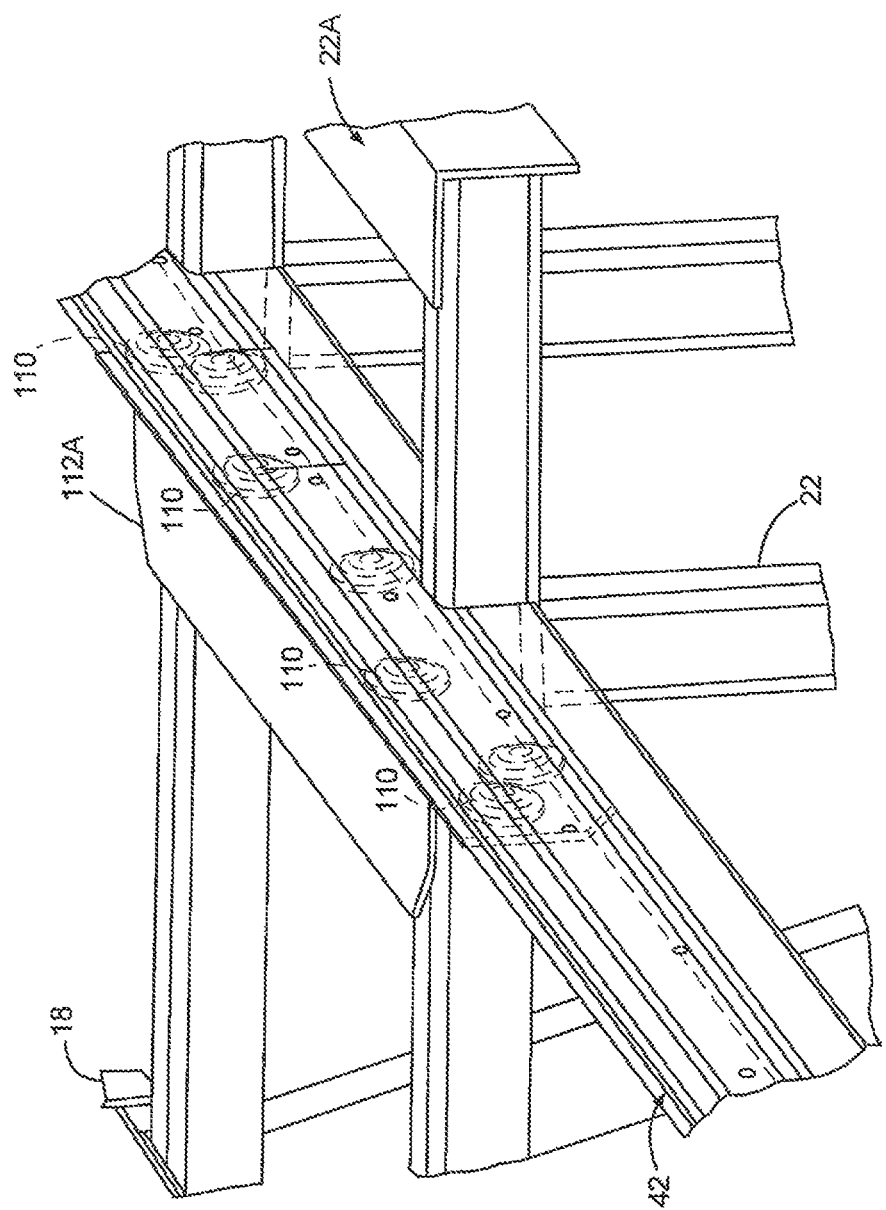
FIG. 15 is a cutaway perspective view of a portion of the sliding table assembly of FIG. 11.
Figure 16:
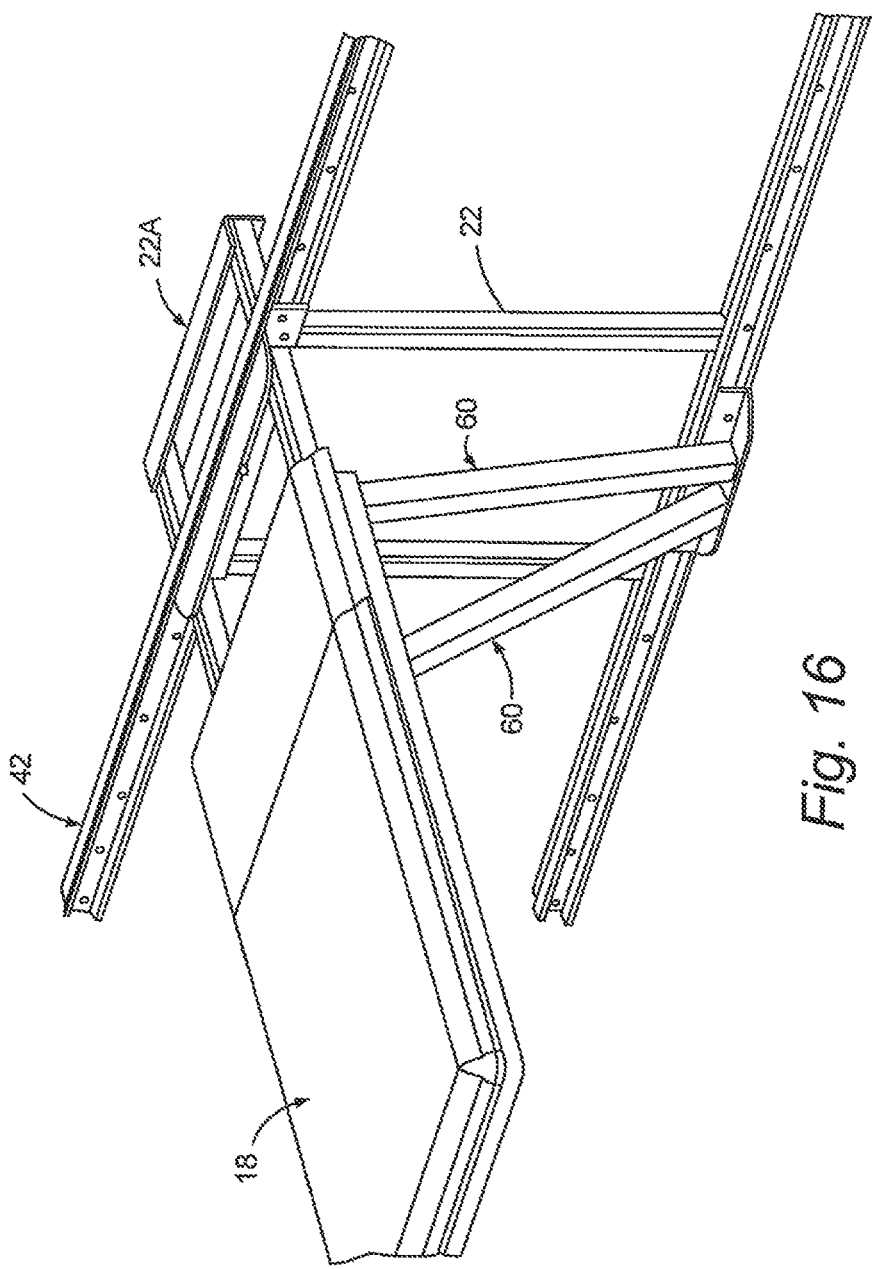
FIG. 16 is a perspective view of the sliding table assembly of FIG. 11.

FIGS. 11-12 and 14-16 show various views of the adjustable table assembly 18 coupled to the table slide frame 22. FIG. 13 shows a side view of the adjustable table assembly 18. As shown in FIGS. 12 and 15, the adjustable table assembly 18 is coupled to table slide frame 22 via the upper roller bearing assembly 112A and the lower roller bearing assembly 112B. For example, the roller bearings 110 of each of the upper roller bearing assembly 112A and the lower roller bearing assembly 112B can be positioned within the upper track 42 and/or the lower track 44 such that the adjustable table assembly 18 can move, horizontally, with respect to the table slide frame 22.

Figure 17:
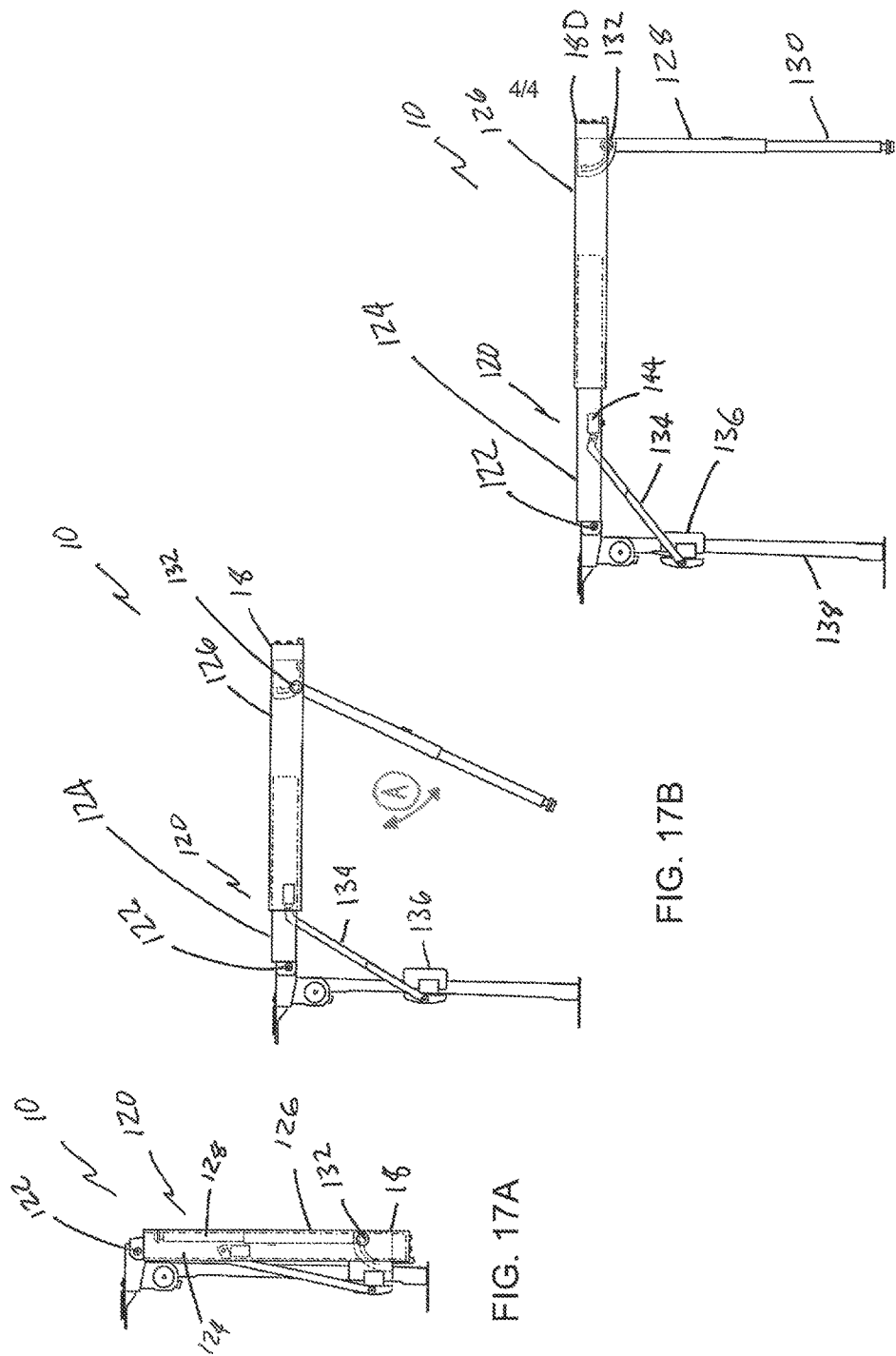
FIG. 17A is a side view of a sliding table assembly in a folded position.
FIG. 17B is a side view of the sliding table assembly of FIG. 17A in a partially-folded position.
FIG. 17C is a side view of the sliding table assembly of FIG. 17A in an extended position.

As best shown in FIGS. 17A-C, in certain implementations, the sliding table system 10 can include a pivoting system 120. In these implementations, the adjustable table assembly 18 can be pivoted "down" into a folded position, as shown in FIG. 17A or "up" in to a use position, as shown in FIG. 17C. The pivoting system 120 has a central pivot 122 that the adjustable table assembly 18 can be selectively rotated downward around.

As shown in FIGS. 17A-C, in certain folding implementations, the adjustable table assembly 18 has two generally elongate telescoping portions: a proximal table portion 124 and a distal table portion 126. Further, in certain implementations, a folding leg 128 can be disposed at a distal table end 18D. In certain implementations, the folding leg 128 has an elongate, telescoping distal portion 130.

As best shown in FIG. 17B, the folding leg 128 is able to rotate around a leg pivot 132 such that the folding leg 128 can be brought within the adjustable table assembly 18 for storage when in the folded position or extended to provide additional support when in the extended position. It is understood that in various alternate implementations, the adjustable table assembly 18, the folding leg 128 or both may not telescope. It is understood that in further alternate implementations, the adjustable table assembly 18 may not have a folding leg 128.

Figure 18:
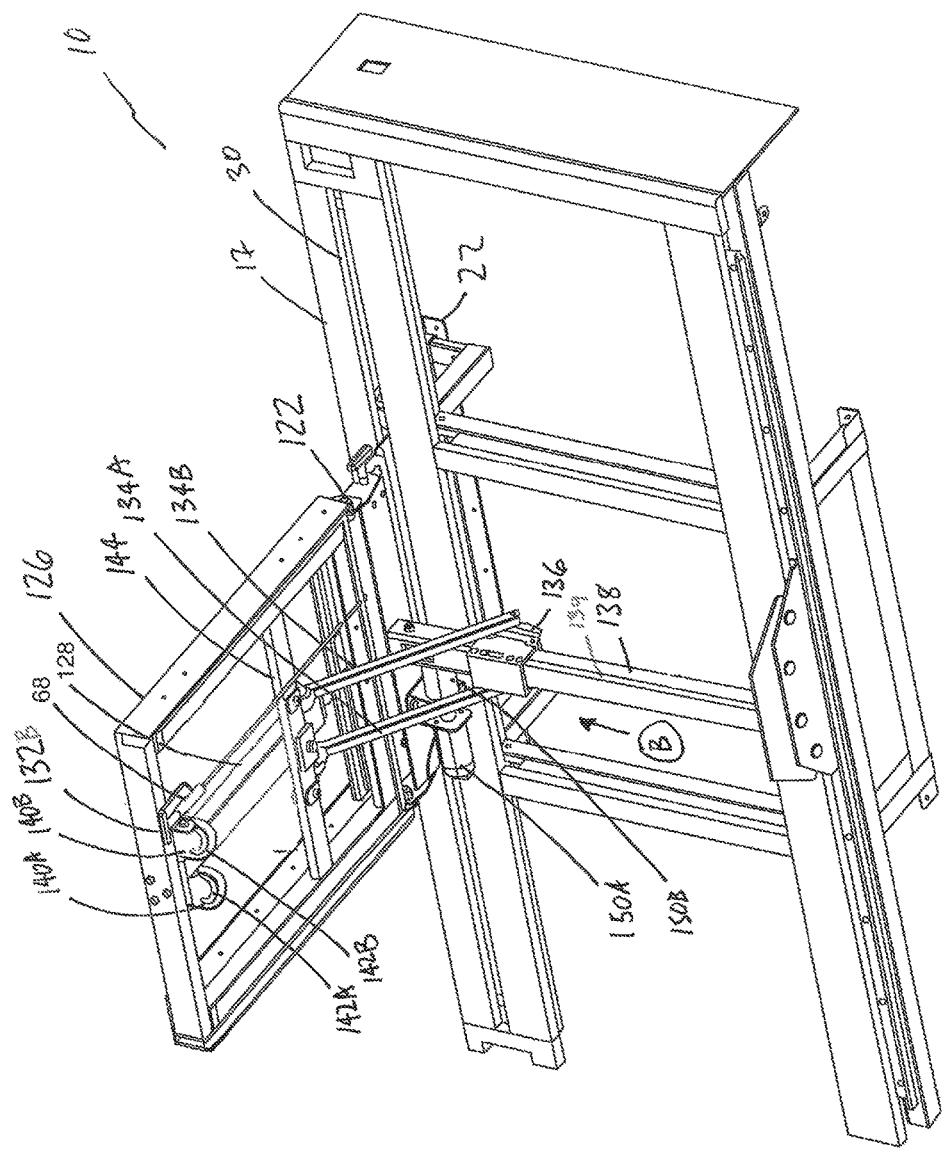
FIG. 18 is a perspective view of an underside of a sliding table assembly.
Figure 19:
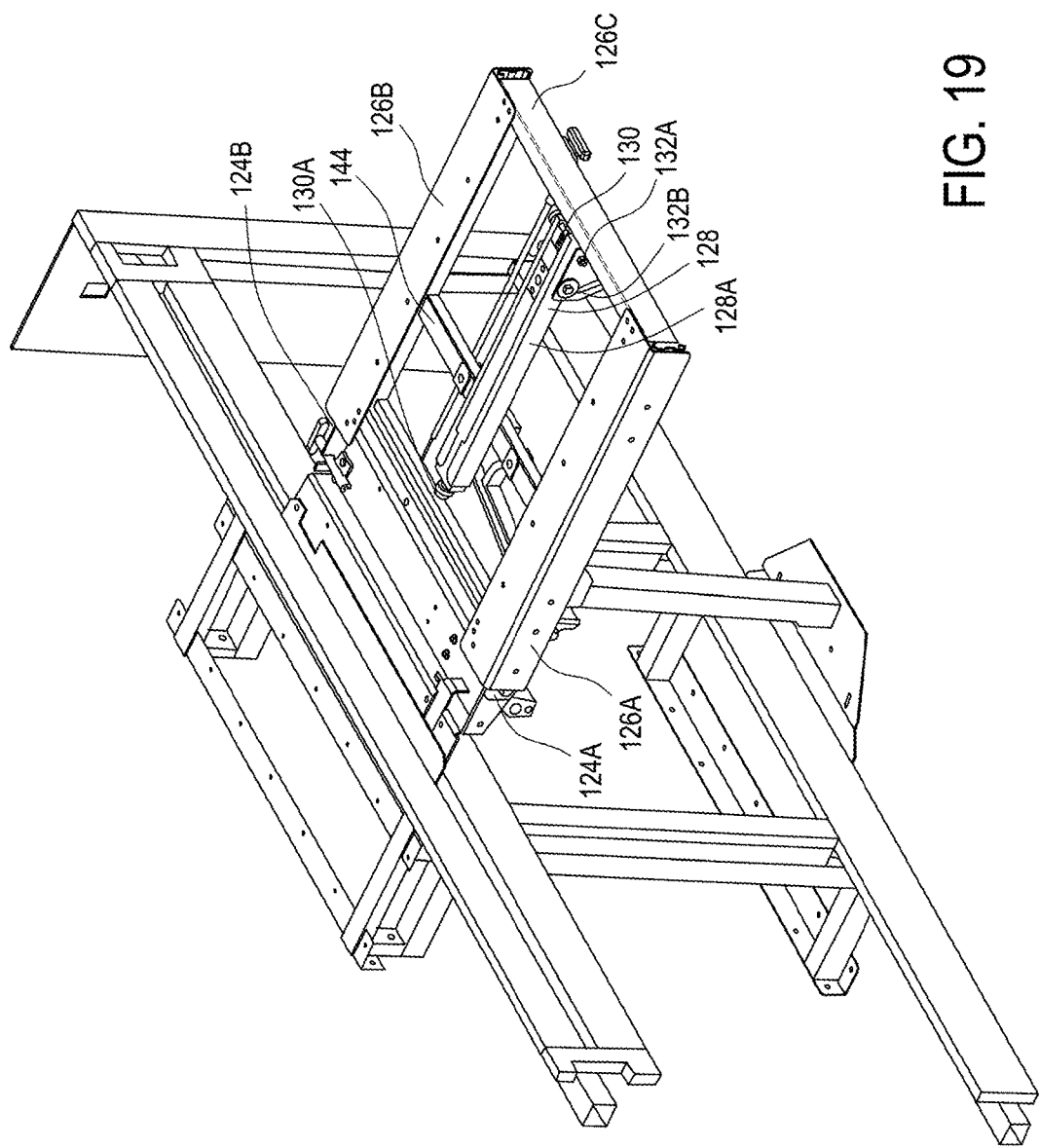
FIG. 19 is a perspective view of the sliding table assembly of FIG. 18.

Continuing with the implementations of FIGS. 17A-C, at least one support brace 134 and a sliding coupling 136 can be operationally integrated with the adjustable table assembly 18 and a support mast 138, as is described further in relation to FIGS. 18-19, so as to actuate the folding or extension action of the adjustable table assembly 18 and/or the proximal table portion 124 and the distal table portion 126.

Turning to FIG. 18, in this embodiment a first leg pivot 132A (see FIGS. 23-24) is disposed in a fixed location and a second leg pivot 132B is in slidable communication between journal pivots 140A, 140B mounted at the distal end 18D of the adjustable table assembly 18. The journal pivots 140A, 140B have elongate openings 142A, 142B configured to allow manual actuation of the folding leg 128 from a folded to an extended position such that the second pivot 132B traverses the elongate openings 142A, 142B, as would be understood by one of skill in the art. In the implementation of FIG. 18, a cross-bar 144 is also slidably connected to the adjustable table assembly 18 in table tracks 146 such that the braces 134A, 134B are able to urge the adjustable table assembly 18 by way of the cross-bar 144 up and away from the table slide frame 22 (shown by reference arrow A in FIG. 17B) as the sliding component 136 moves upward on the support mast 138. The movement is shown by reference arrow B in FIG. 18.

In certain implementations, the movement of the sliding component 136 relative to the mast 138 is actuated by at least one motor 150A, 150B disposed on the underside of the adjustable table assembly 18 and adjacent to the cabinet face 17. In certain implementations, the motor or motors 150A, 150B are in operable communication with a worm gear assembly 148 (see FIGS. 22-25) to convert rotational movement from the motors 150A, 150B into linear movement by way of an elongate, grooved rod, or worm rod 149A which is capable of driven rotation so as to cause the up/down movement of the sliding component 136 by way of a driven component 149B. A further depiction of the worm gear assembly 148, having the elongate, grooved worm rod 149A and the driven shuttle 149B is shown in FIGS. 22-25, and the sliding component 136 is shown in greater detail in FIG. 26.

It is understood that the motor or motors 150A, 150B can be operated by known electrical switches and other control methods, such as a switch or buttons mounted in the interior of the recreational vehicle 12, for example on one of the interior walls, or elsewhere as desired. Various electrical cables and additional components can be routed through the cabinet housing 16 through various routes, as would be appreciated by the skilled artisan. In any event, the motor or motors 150A, 150B can be in electrical communication with an operations system and a vehicle electrical system so as to be controlled and powered as would be understood.

Continuing with FIG. 18, in various implementations, several motors 150A, 150B are run in series to provide the adequate torque to drive the worm gear assembly 148 and maintain smooth movement of the adjustable table assembly 18 from the "up" and "down" positions, as would be understood by those of skill in the art. It is understood that in various implementations, the sliding component 136 is slidably mounted on an exterior of the mast 138 by way of at least one track 139, with the worm gear assembly 148 disposed within the support mast 138 and in operable communication with the sliding component 136. As discussed below, the driven component 149B is disposed within the support mast 138 and fixedly attached to the sliding component 136 through the at least one track 139.

In these implementations, the upward movement of the sliding component 136 relative to the support mast 138 urges the braces 134A, 134B against the cross-bar 144 so as to raise the adjustable table assembly 18. It is understood that further configurations are possible. In various implementations, after the adjustable table assembly 18 has been raised, the distal portion 126 can be urged into the extended position, thereby allowing movement of the folding leg 128.

Figure 27B:
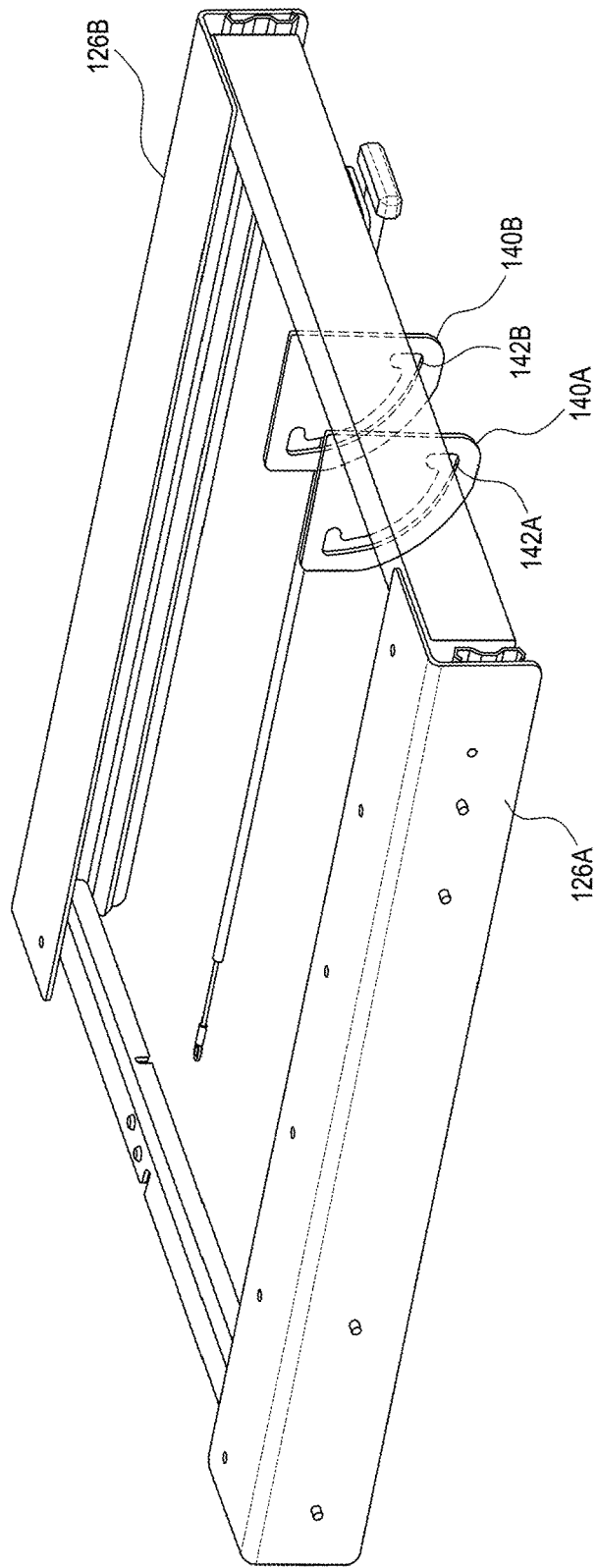
FIG. 27B is perspective view of a distal table portion.

As best shown in FIG. 19, it is understood that in these implementations, the folding leg 128 is disposed between a tabletop surface (not shown) and the cross-bar 144 when the distal table portion 126 and the proximal table portion 124 are in the "closed" or "unexpanded" position, as is shown in the implementation of FIG. 18. In the implementation of FIG. 19, the proximal table portion 124 has first 124A and second 124B side beams that are in slidable communication beneath first 126A and second 126B distal table supports, as would be understood by one of skill in the art. A further depiction of these implementations is in FIGS. 27A-27C.

Figure 28A:
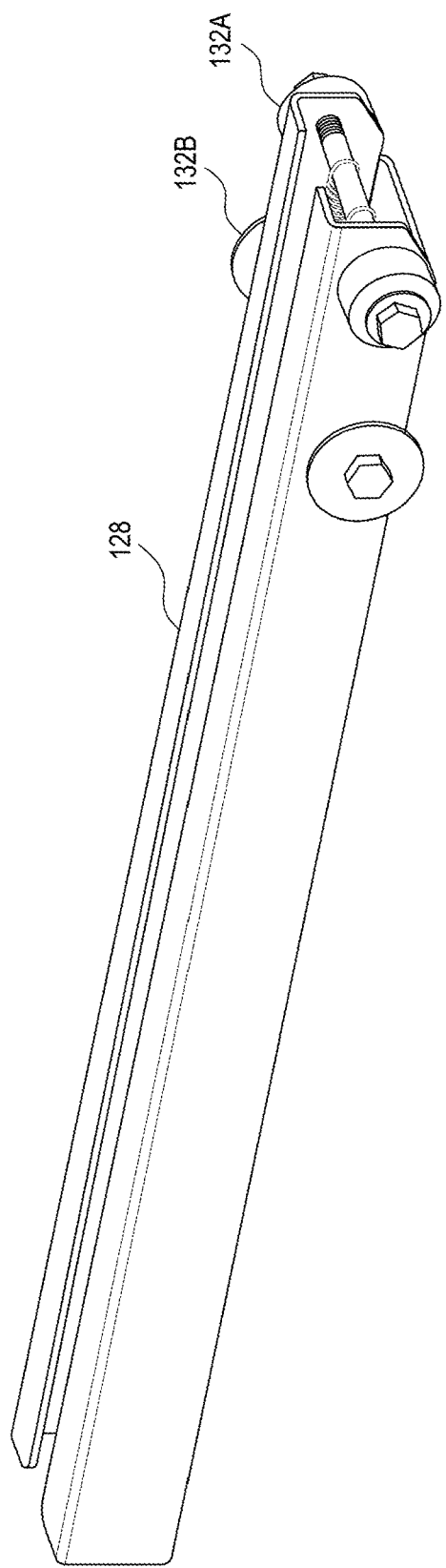
FIG. 28A is a perspective view of a folding leg.
Figure 28B:
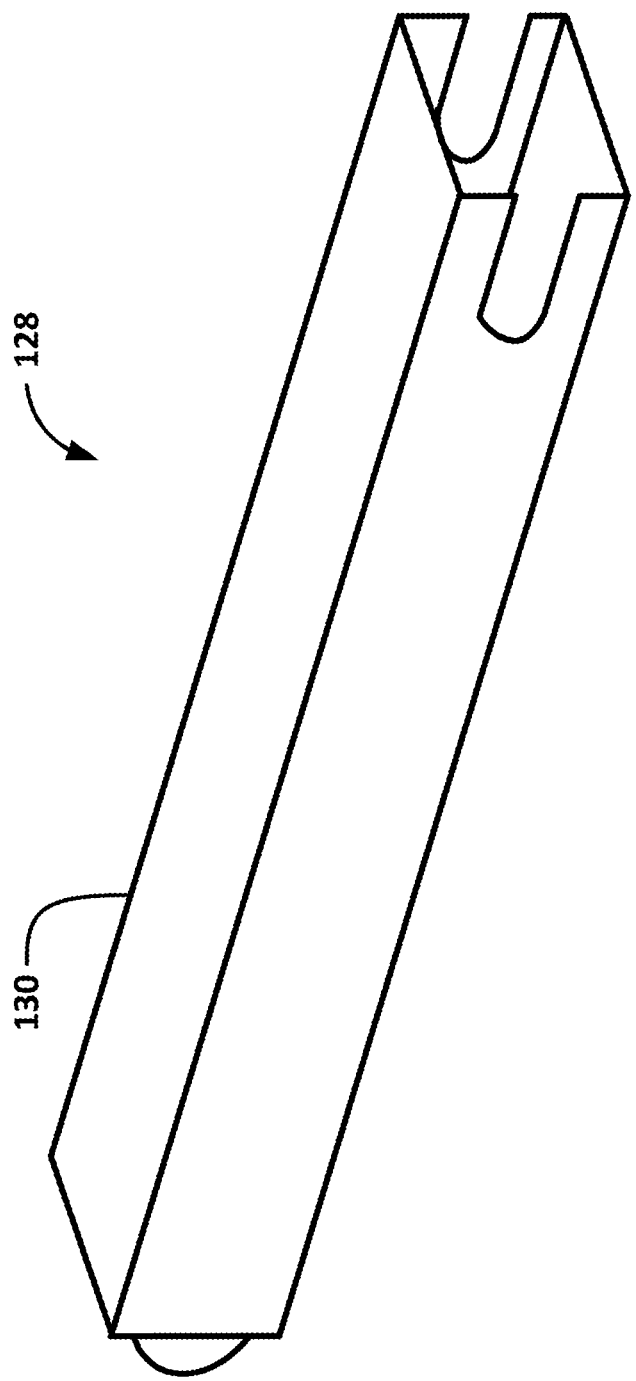
FIG. 28B is a perspective view of the folding leg of FIG. 28A.

In these implementations, the folding leg 128 has an elongate, hollow outer shaft 128A with the telescoping distal leg portion 130 slidably disposed within the shaft 128A. The leg pivot 132 of these implementations is generally disposed adjacent to a distal support beam 129 of the distal table portion 126, such that the outward extension of the distal table portion 126 corresponds to movement of the folding leg 128 relative to the cross-bar 144. Detailed views of the leg portions can be seen in relation to FIGS. 28A-28B.

Figure 23:
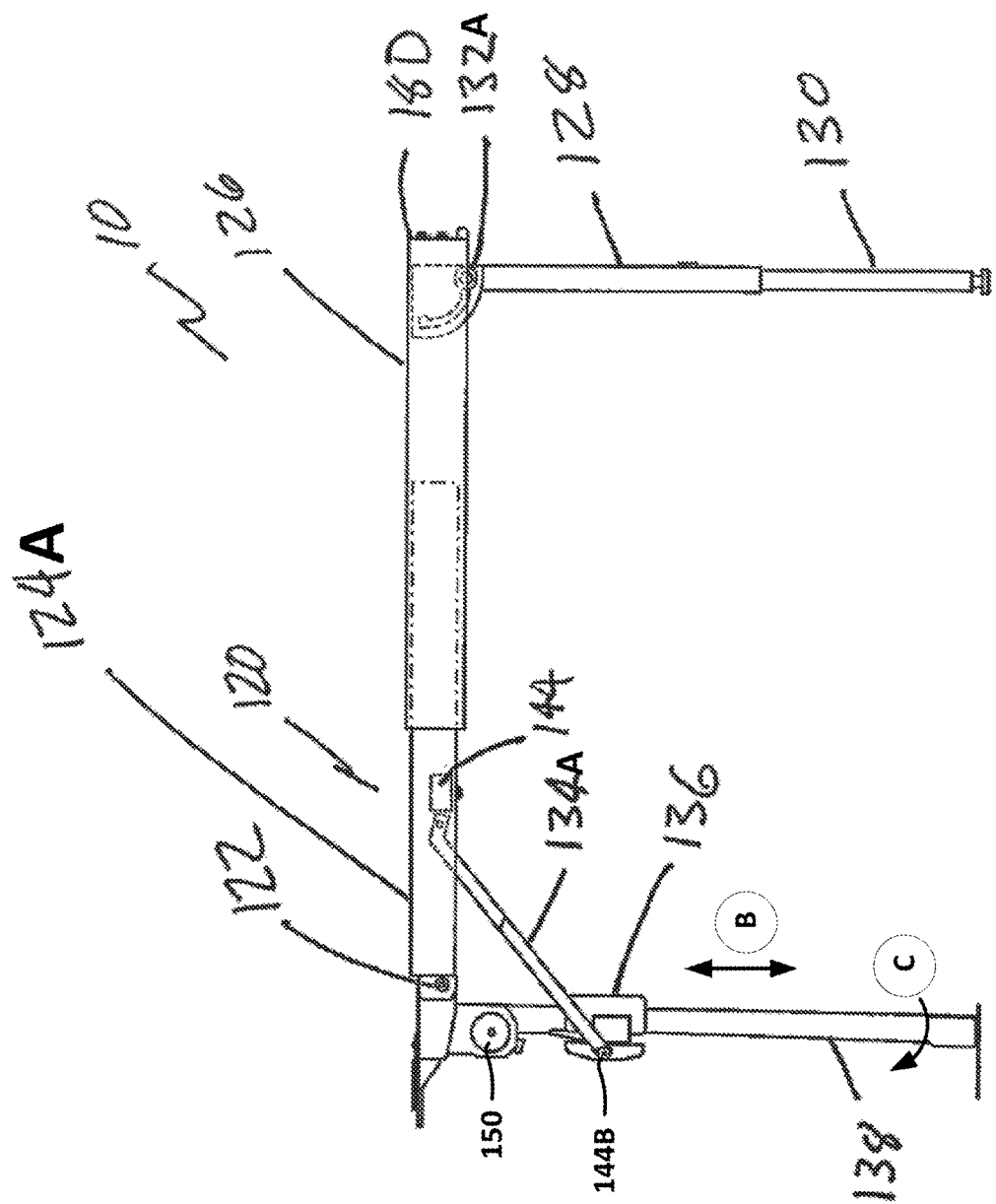
FIG. 23 is a side view of the sliding table assembly of FIG. 22 having the folding leg in the folded position.
Figure 24:
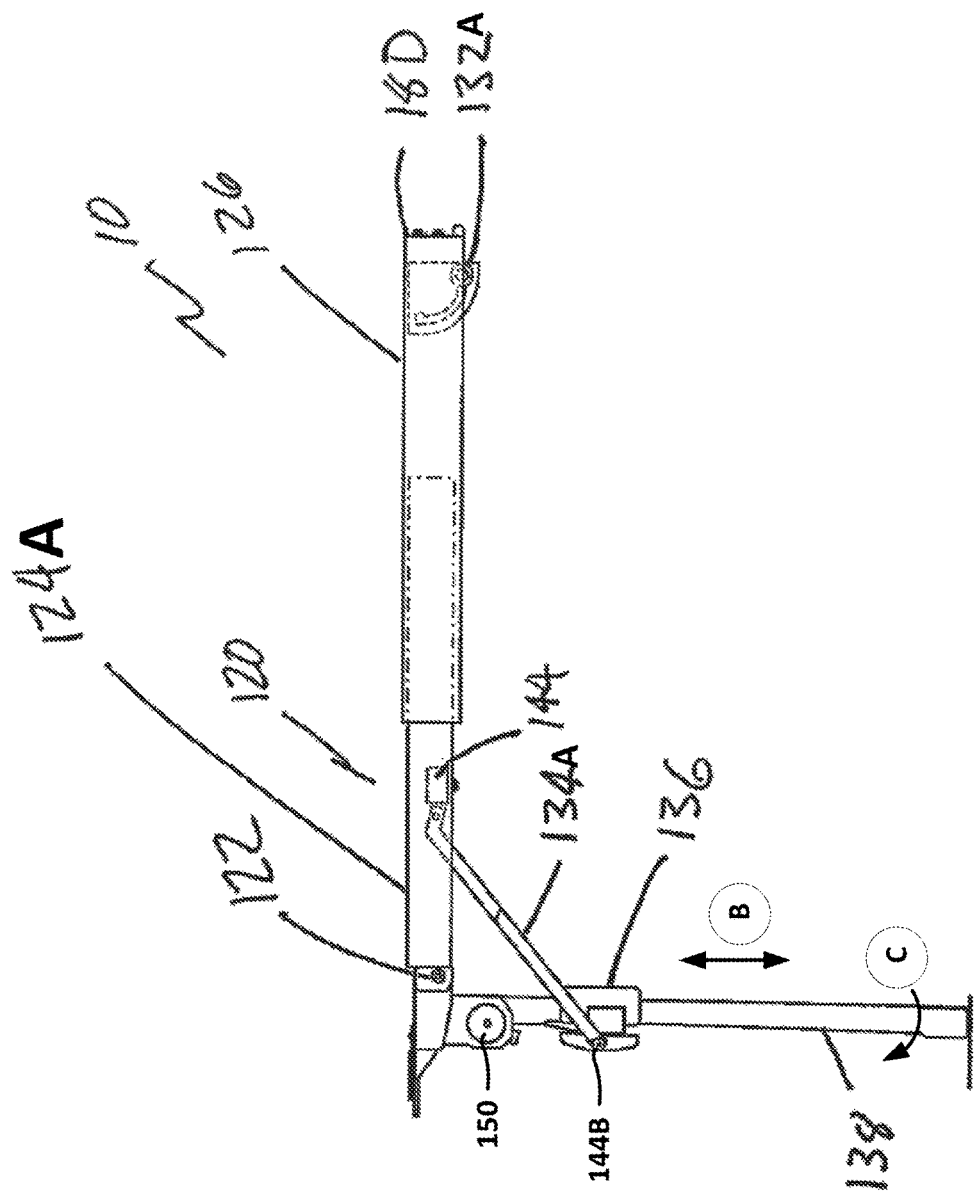
FIG. 24 is a side view of the sliding table assembly of FIG. 22 having the folding leg in an extended position.

In this implementation, when the table 18 is urged into the "up" position, the distal table portion 126 can be urged to bring the distal leg end 130A past the cross-bar 144 so as to allow it to be freely rotated downward, as is shown in FIGS. 23-24. In certain circumstances, either or both of the table extension and/or leg rotation and extension can be done manually. Other implementations are possible.

Figure 20:
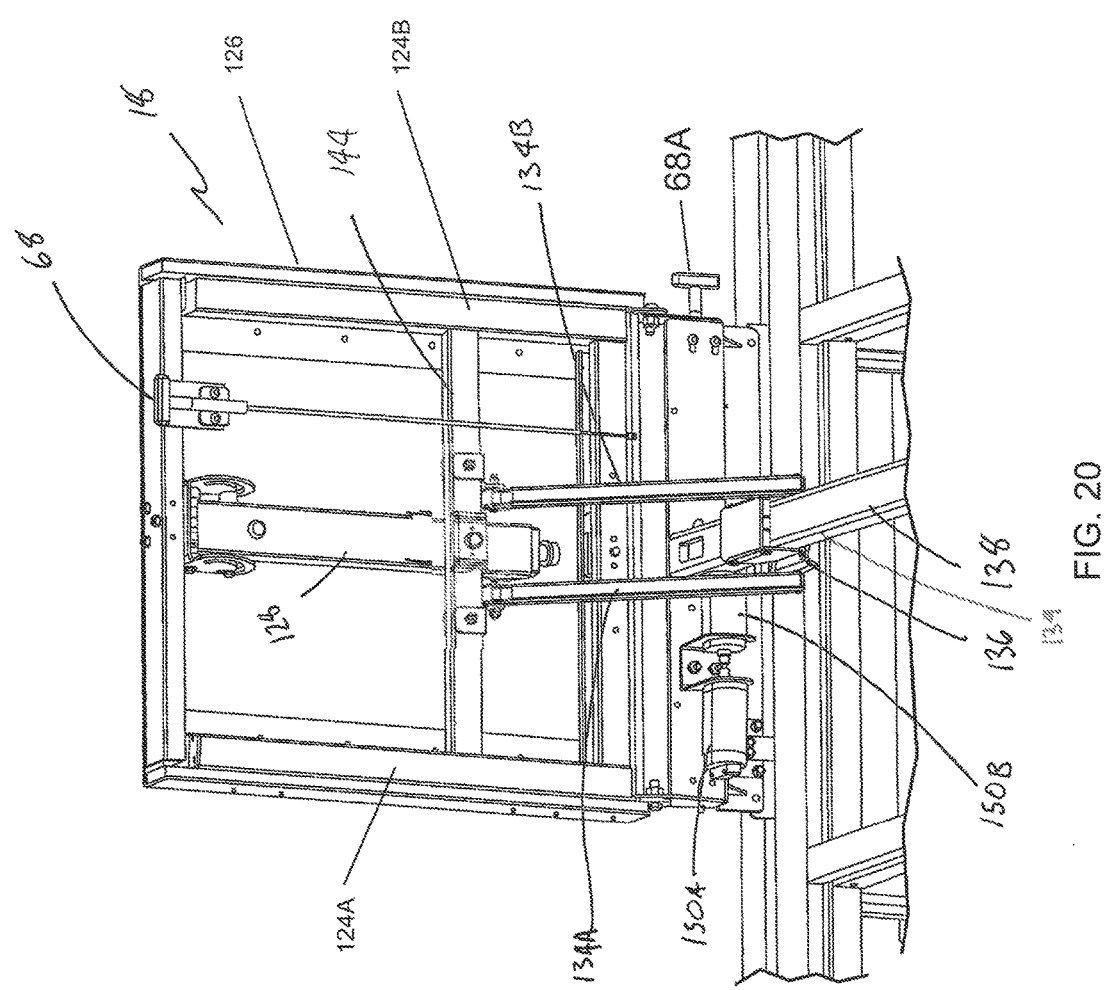
FIG. 20 is a bottom view of the sliding table assembly of FIG. 18.
Figure 21:
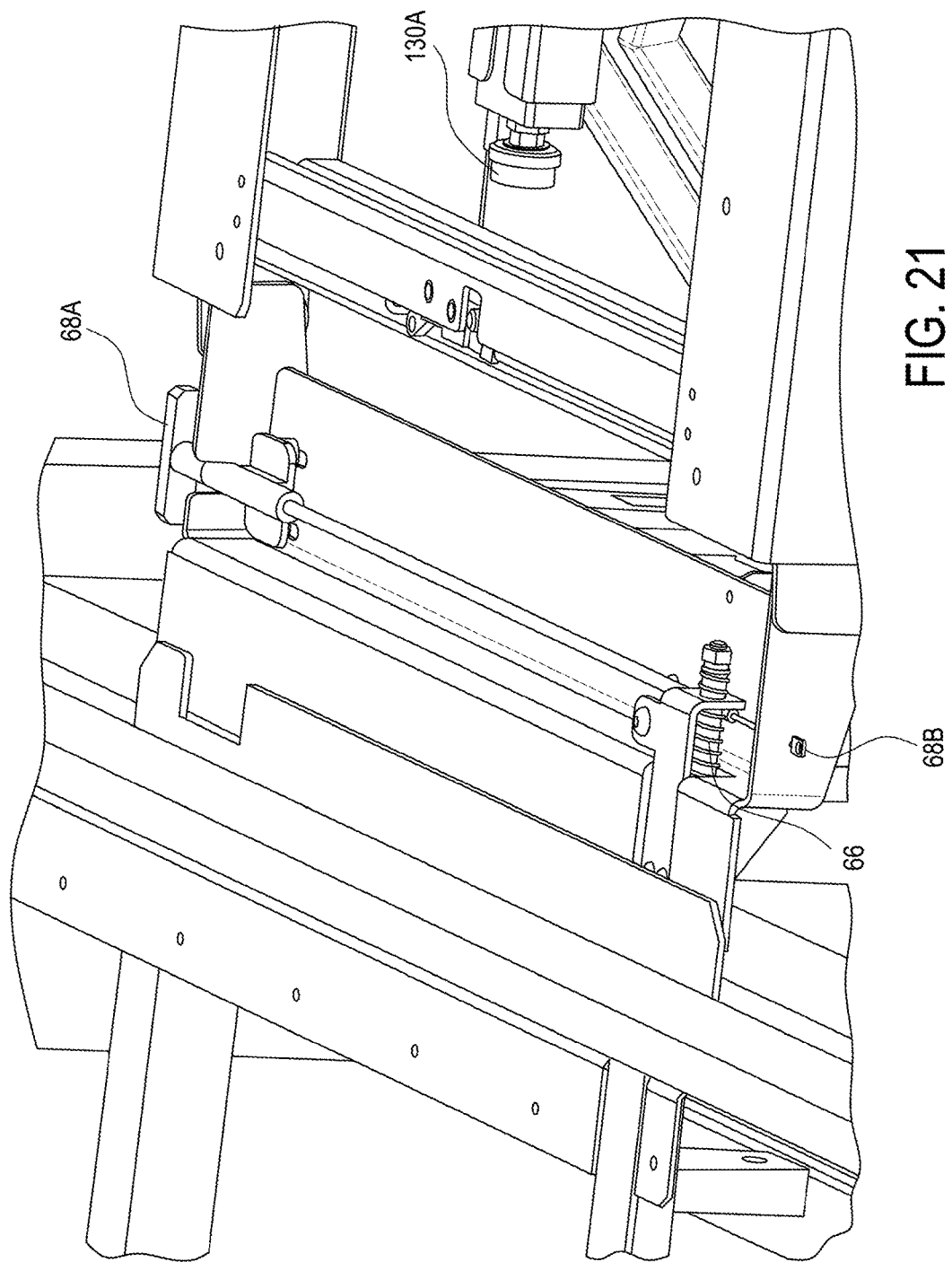
FIG. 21 is a perspective view of a portion of the sliding table assembly of FIG. 18.

FIGS. 20-21 show the table support frame 50 including the release catch handle 68, which is operationally coupled to the spring tensioned release catch 66 by way of the cable 70, which extends the length of the table support frame 50. In these embodiments, a second release catch handle 68A is also disposed perpendicular to the release catch handle 68, also being operationally integrated with the release catch 66. It is understood that in certain implementations, the table system 10 of any embodiment may only have the release catch handle 68 or the second release catch handle 68A.

In the implementation of FIG. 21, a plunger cable (not shown) is in operable communication with the second release handle at a distal end 68B and the spring tensioned release catch 66, such that when a user "pulls" the second release catch handle 68A, the cable 70 is urged through a through point thereby urging the spring tensioned release catch 66 away from the catch (not shown), thereby releasing the adjustable table assembly 18 to slide in either direction, as has been previously described.

Figure 22:
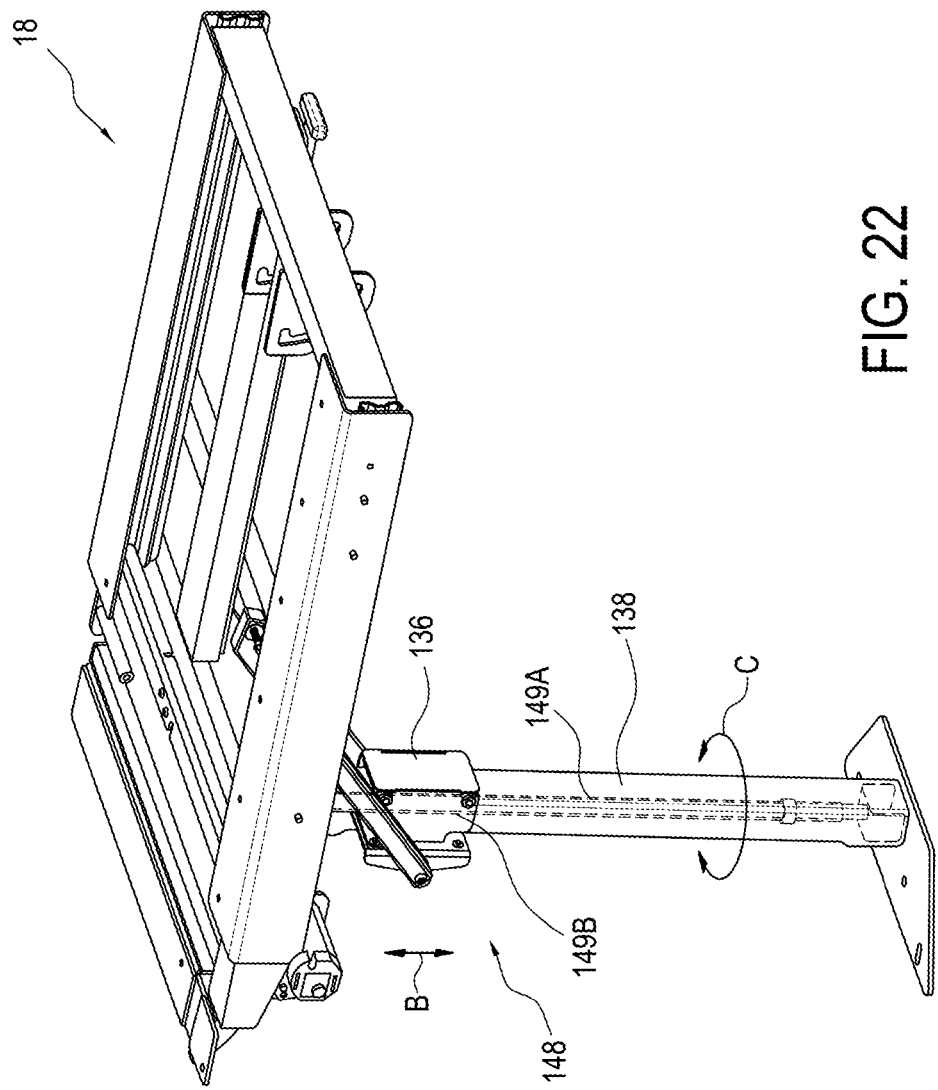
FIG. 22 is a perspective view of a sliding table assembly having a folding leg is a folded position.
Figure 25:
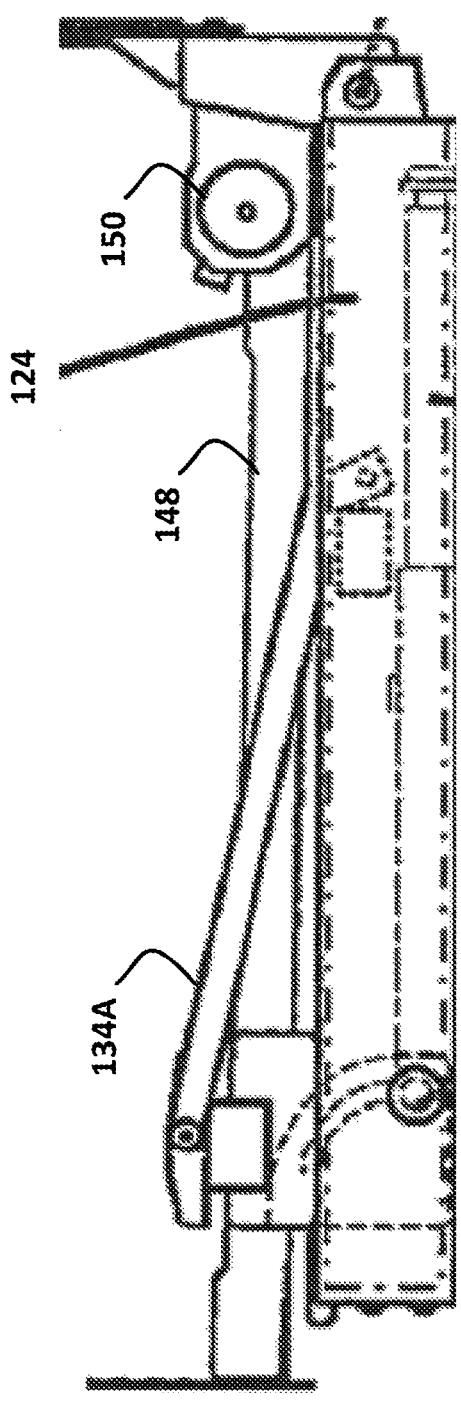
FIG. 25 is a side view of the sliding table assembly of FIG. 22 having the folding leg in the folded position.

FIGS. 22-26 depict various additional views of the worm gear assembly 148. As best shown in FIGS. 22 and 25, the worm gear assembly 148 in certain implementations has the elongate, grooved worm rod 149A disposed within the support mast 138 and in operable communication with the motors 150A, 150B. In these implementations, the driving motors 150A, 150B can rotate the elongate, grooved worm rod 149A (as shown by reference arrow C) so as to urge the driven. component 149B upward or downward (as shown by reference arrow B).

As is shown in the implementation of FIGS. 22-26, it is understood that in various implementations, driven component 149B is disposed within the support mast 138 and fixedly attached to the sliding component 136 through the at least one track 139, and is in operable communication with the elongate, grooved worm rod 149A such that rotation of the elongate, grooved worm rod 194A (reference arrow C) urges the shuttle 149B and correspondingly the sliding component 136 and the adjustable table assembly 18 upward or downward by way of a worm coupling component 160, which is adapted to be slidably coupled to the elongate, grooved worm rod 149A so as to be urged by the movement of the rod elongate, grooved worm 149A grooves.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A table system comprising:
   a cabinet housing;
   a slide frame positioned within the cabinet housing;
   an adjustable table assembly including a table support frame slideably coupled to the slide frame;
   a pivot system coupled to the adjustable table assembly, the pivot system comprising:
     a support mast, and
     a sliding component coupled to the support mast such that the sliding component is configured to slide up the support mast such that the adjustable table assembly pivots around a pivot point between an up position and a down position;
   a motor configured to position the sliding component to move the adjustable table assembly between the up position and the down position; and
   a worm gear assembly coupled to the motor and configured to covert rotational movement of the motor to linear movement such that the sliding component moves linearly along the support mast.

2. The table system of claim 1, wherein the slide frame includes an upper track and a lower track.

3. The table system of claim 2, wherein the table support frame is coupled to an upper roller bearing assembly comprising a first set of roller bearings and is coupled to a lower roller bearing assembly comprising a second set of roller bearings, wherein the first set of roller bearings are positioned within the upper track, and wherein the second set of roller bearings are positioned within the lower track.

4. The table system of claim 1, further comprising:
   a striker latch plate coupled to the cabinet housing; and
   a release latch configured to be moved into either an unlocked state to permit horizontal movement of the adjustable table assembly with respect to the cabinet housing or a locked state to maintain a position of the adjustable table assembly with respect to the cabinet housing.

5. The table system of claim 1, wherein the adjustable table assembly comprises a folding leg having a proximal end positioned near a distal end of the adjustable table assembly, wherein the folding leg is configured to extend to provide support for the adjustable table assembly in the up position.

6. The table system of claim 5, wherein the folding leg includes an elongate, telescoping distal portion.

7. The table system of claim 1, wherein the adjustable table assembly includes a table track coupled to the sliding component via a brace.

8. The table system of claim 1, wherein the worm gear assembly is at least partially positioned within the support mast.

9. The table system of claim 1, wherein the worm gear assembly comprises an elongate, grooved worm rod.

10. The table system of claim 1, further comprising:
    a release catch configured to be pulled into an unlocked state such that the adjustable table assembly can be moved relative to the cabinet housing.

11. A table system comprising:
    an adjustable table assembly including:
      a proximal table portion including a pivot around which the adjustable table assembly is configured to pivot,
      a distal table portion having a distal end and slideable between an expanded position and an unexpanded position, and
      a folding leg having a proximal section attached near the distal end of the distal table portion; and
    a pivot system coupled to the adjustable table assembly, the pivot system including:
      a support mast, and
      a sliding component coupled to the support mast such that the sliding component is configured to slide up and down the support mast such that the adjustable table assembly pivots around the pivot point between an up position and a down position;
    wherein, when the adjustable table assembly is in the up position and the distal table portion is in the unexpanded position, the folding leg is unable to be transitioned from a folded position to an unfolded position, and
    wherein, when the adjustable table assembly is in the up position and the distal table portion is in the expanded position, the folding leg is able to be transitioned from the folded position to the unfolded position.

12. The table system of claim 11, wherein, when the adjustable table assembly is in the down position, the folding leg is unable to be transitioned from the folded position to the unfolded position.

13. The table system of claim 11, wherein the distal table portion is configured to be moved relative to the proximal table portion.

14. The table system of claim 11, further comprising:
    a motor configured to position the sliding component to move the adjustable table assembly between the up positioned and the down position.

15. The table system of claim 14, further comprising:
    a worm gear assembly coupled to the motor and configured to covert rotational movement of the motor to linear movement such that the sliding component moves linearly along the support mast.

16. The table system of claim 15, wherein the worm gear assembly is at least partially positioned within the support mast.

17. The table system of claim 16, wherein the worm gear assembly comprises an elongate, grooved worm rod.

18. The table system of claim 11, further comprising a cross-bar coupled to the adjustable table assembly.

19. The table system of claim 18, wherein the folding leg is disposed between the distal table portion and the cross-bar in the unexpanded position and is unable to be transitioned from the folded position to the unfolded position.

20. The table system of claim 18, wherein the distal table portion is configured to be urged away from the proximal table portion when transitioning from the unexpanded position to the expanded position such that a distal leg end of the folding leg is proximal to the cross-bar in the expanded position.

21. A table system comprising:
    a cabinet housing;
    a slide frame positioned within the cabinet housing;
    an adjustable table assembly including:
      a table support,
      a tabletop slideably coupled to the table support frame and configured to transition between an unexpanded position and an expanded position, and a folding leg pivotably coupled to the tabletop,
wherein, when the adjustable table assembly is in an up position and the tabletop is in the unexpanded position, the folding leg is unable to be transitioned from a folded position to an unfolded position, and
wherein, when the adjustable table assembly is in the up position and the distal table portion is in the expanded position, the folding leg is able to be transitioned from the folded position to the unfolded position;
means for horizontally moving the adjustable table assembly with respect to the slide frame; and
means for pivoting the adjustable table assembly between an up position and a down position.

* * * * *

UNITED STATES PATENT AND TRADEMARK OFFICE
CERTIFICATE OF CORRECTION

PATENT NO. : 10,059,241 B2
APPLICATION NO. : 15/651505
DATED : August 28, 2018
INVENTOR(S) : Steven Jergenson Page 1 of 1

It is certified that error appears in the above-identified patent and that said Letters Patent is hereby corrected as shown below:

In the Claims

Column 10, Line 64:
After the words "a table support", insert the word --frame--

Signed and Sealed this
Twenty-eighth Day of May, 2019

Andrei Iancu
*Director of the United States Patent and Trademark Office*